US012672020B2

(12) United States Patent
Ganti et al.

(10) Patent No.: US 12,672,020 B2
(45) Date of Patent: Jun. 30, 2026

(54) MITIGATING FREQUENCY COLLISIONS IN A MEASUREMENT

(71) Applicant: QUALCOMM Incorporated, San Diego, CA (US)

(72) Inventors: Kamalakar Ganti, San Marcos, CA (US); Shreya Satish Nayak, San Diego, CA (US); Thawatt Gopal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 337 days.

(21) Appl. No.: 18/500,941

(22) Filed: Nov. 2, 2023

(65) Prior Publication Data

US 2025/0150871 A1 May 8, 2025

(51) Int. Cl.
 *H04W 24/10* (2009.01)
 *H04W 64/00* (2009.01)
 *H04W 88/06* (2009.01)
(52) U.S. Cl.
 CPC ......... *H04W 24/10* (2013.01); *H04W 64/006* (2013.01); *H04W 88/06* (2013.01)
(58) Field of Classification Search
 None
 See application file for complete search history.

(56) References Cited

U.S. PATENT DOCUMENTS

| | | | | |
|---|---|---|---|---|
| 2016/0150536 A1* | 5/2016 | Valliappan | ........ | H04W 74/0816 |
| | | | | 370/329 |
| 2016/0262048 A1* | 9/2016 | Asterjadhi | ........... | H04B 7/0811 |
| 2016/0366626 A1* | 12/2016 | Krishnamoorthy | ... | H04W 36/20 |
| 2017/0201973 A1 | 7/2017 | Yang et al. | | |
| 2019/0053280 A1 | 2/2019 | Rico Alvarino et al. | | |
| 2022/0086700 A1* | 3/2022 | Nguyen | ............... | H04W 24/10 |
| 2023/0254715 A1 | 8/2023 | Cui et al. | | |

OTHER PUBLICATIONS

International Search Report and Written Opinion—PCT/US2024/050325—ISA/EPO—Jan. 28, 2025.

* cited by examiner

*Primary Examiner* — Adolf Dsouza
(74) *Attorney, Agent, or Firm* — Harrity & Harrity, LLP

(57) ABSTRACT

In a wireless communication system, a user equipment (UE) may receive a conflict indication that indicates a frequency conflict between a first radio access technology (RAT) and a second RAT that are supported by the UE. The UE may perform a collision monitoring procedure that is associated with the second RAT and comprises at least: calculating at least a collision metric that is associated with the first RAT and the second RAT, the collision metric being based at least in part on a signal measurement occasion that is associated with generating a mobility measurement metric, the mobility measurement metric being associated with the second RAT. The UE may selectively calculate the mobility measurement metric based at least in part on a frequency conflict duration, the signal measurement occasion, and the collision metric.

30 Claims, 9 Drawing Sheets

KEY:

VWWAN Coverage

WLAN Coverage

Estimated WLAN coverage

Overlapping Coverage

500 —▶

120

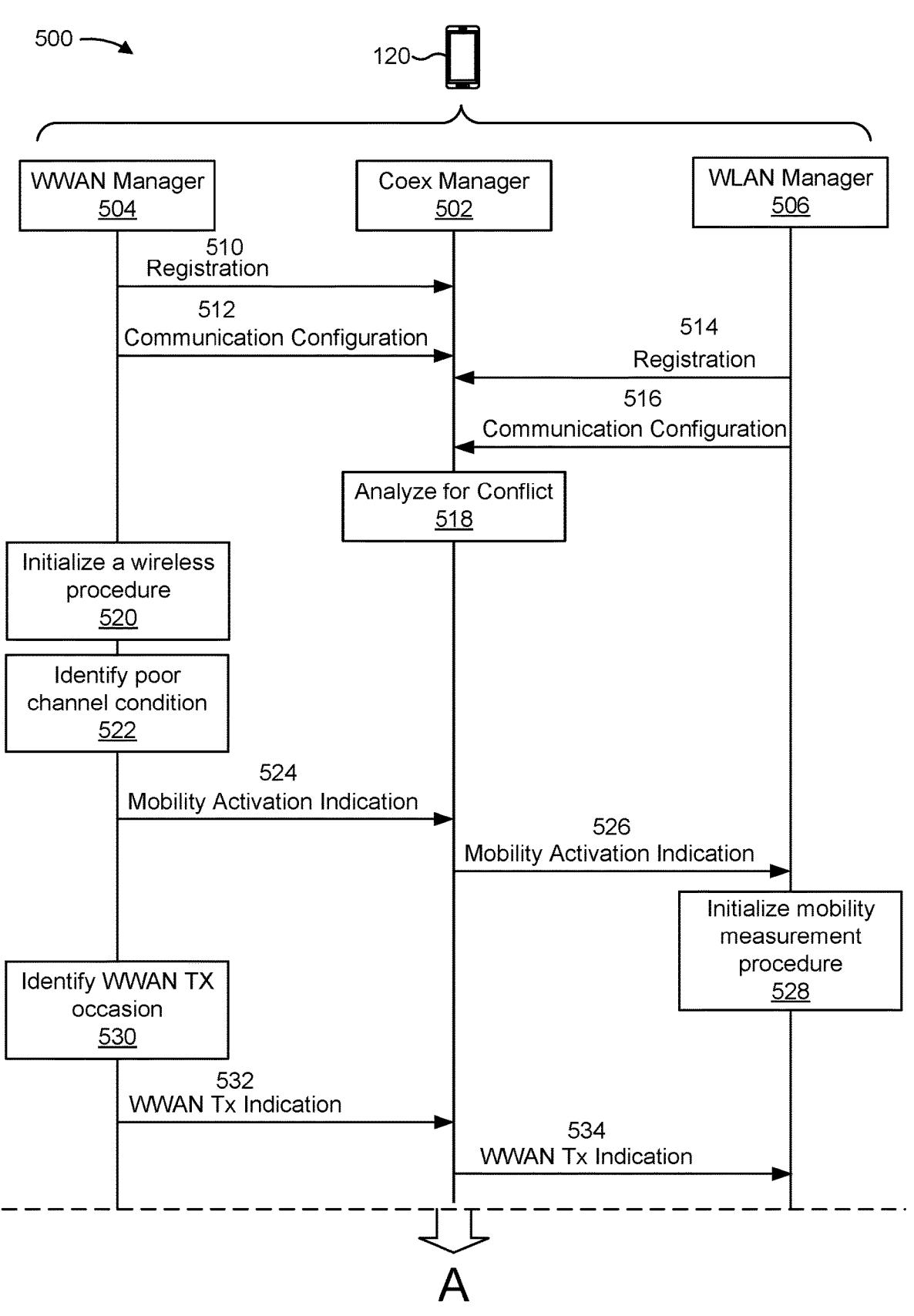

| WWAN Manager 504 | Coex Manager 502 | WLAN Manager 506 |

510
Registration

512
Communication Configuration

514
Registration

516
Communication Configuration

Analyze for Conflict
518

Initialize a wireless procedure
520

Identify poor channel condition
522

524
Mobility Activation Indication

526
Mobility Activation Indication

Initialize mobility measurement procedure
528

Identify WWAN TX occasion
530

532
WWAN Tx Indication

534
WWAN Tx Indication

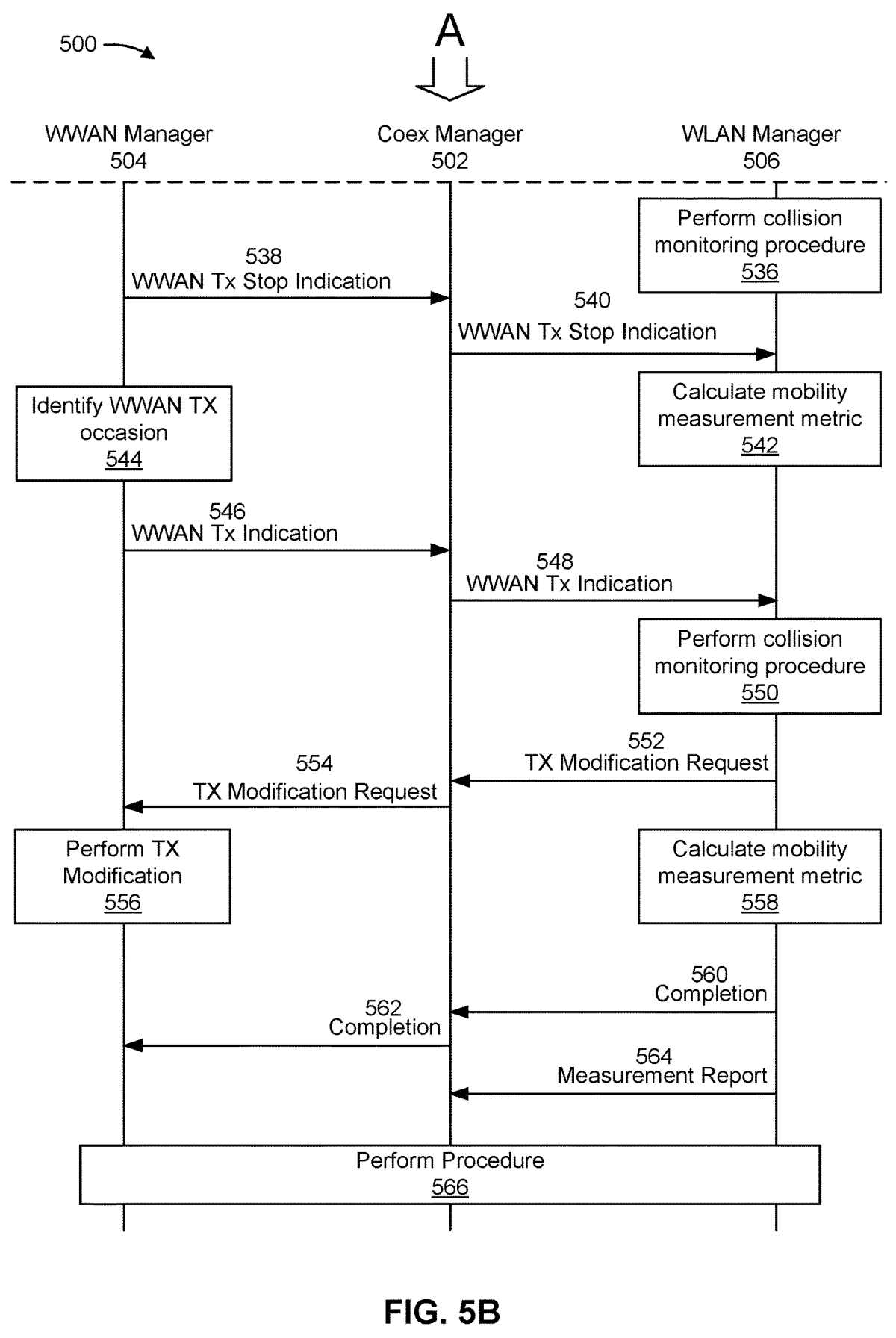

| WWAN Manager 504 | Coex Manager 502 | WLAN Manager 506 |

Perform collision monitoring procedure
536

538
WWAN Tx Stop Indication

540
WWAN Tx Stop Indication

Identify WWAN TX occasion
544

Calculate mobility measurement metric
542

546
WWAN Tx Indication

548
WWAN Tx Indication

Perform collision monitoring procedure
550

552
TX Modification Request

554
TX Modification Request

Perform TX Modification
556

Calculate mobility measurement metric
558

560
Completion

562
Completion

564
Measurement Report

Perform Procedure
566

FIG. 5B

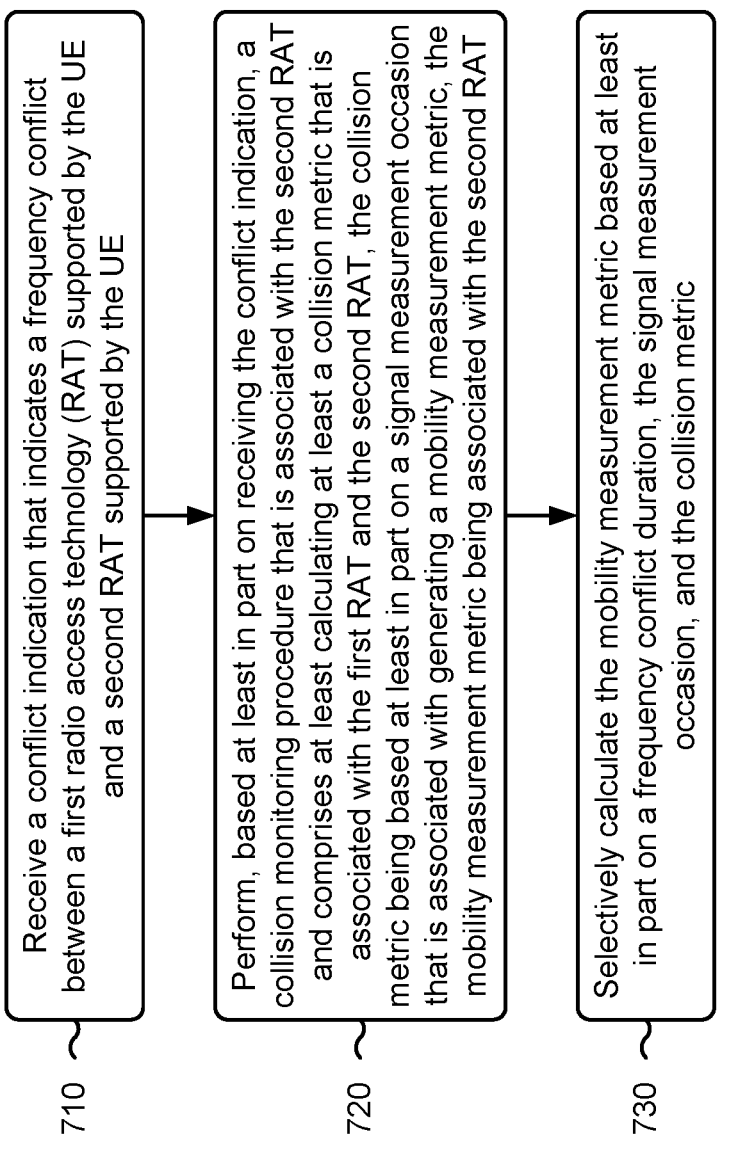

700

710 — Receive a conflict indication that indicates a frequency conflict between a first radio access technology (RAT) supported by the UE and a second RAT supported by the UE 720 — Perform, based at least in part on receiving the conflict indication, a collision monitoring procedure that is associated with the second RAT and comprises at least calculating at least a collision metric that is associated with the first RAT and the second RAT, the collision metric being based at least in part on a signal measurement occasion that is associated with generating a mobility measurement metric, the mobility measurement metric being associated with the second RAT 730 — Selectively calculate the mobility measurement metric based at least in part on a frequency conflict duration, the signal measurement occasion, and the collision metric

Reception Component 802

Communication Manager 806

Transmission Component 804

808

MITIGATING FREQUENCY COLLISIONS IN A MEASUREMENT

FIELD OF THE DISCLOSURE

Aspects of the present disclosure generally relate to wireless communication and to techniques and apparatuses for mitigating frequency collisions in a measurement.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a conflict indication that indicates a frequency conflict between a first radio access technology (RAT) supported by the UE and a second RAT supported by the UE. The method may include performing, based at least in part on receiving the conflict indication, a collision monitoring procedure that is associated with the second RAT and comprises at least: calculating at least a collision metric that is associated with the first RAT and the second RAT, the collision metric being based at least in part on a signal measurement occasion that is associated with generating a mobility measurement metric, the mobility measurement metric being associated with the second RAT. The method may include selectively calculating the mobility measurement metric based at least in part on a frequency conflict duration, the signal measurement occasion, and the collision metric.

Some aspects described herein relate to an apparatus for wireless communication at a UE. The apparatus may include one or more memories and one or more processors coupled to the one or more memories. The one or more processors may be configured, individually or collectively, to receive a conflict indication that indicates a frequency conflict between a first RAT supported by the UE and a second RAT supported by the UE. The one or more processors may be configured, individually or collectively, to perform, based at least in part on receiving the conflict indication, a collision monitoring procedure that is associated with the second RAT. To perform the collision monitoring procedure, the one or more processors may be configured, individually or collectively, to cause the UE to at least: calculate at least a collision metric that is associated with the first RAT and the second RAT, the collision metric being based at least in part on a signal measurement occasion that is associated with generating a mobility measurement metric, the mobility measurement metric being associated with the second RAT. The one or more processors may be configured, individually or collectively, to selectively calculate the mobility measurement metric based at least in part on a frequency conflict duration, the signal measurement occasion, and the collision metric.

Some aspects described herein relate to a non-transitory computer-readable medium that stores a set of instructions for wireless communication by a UE. The set of instructions, when executed by one or more processors of the UE, may cause the UE to receive a conflict indication that indicates a frequency conflict between a first RAT supported by the UE and a second RAT supported by the UE. The set of instructions, when executed by one or more processors of the UE, may cause the UE to perform, based at least in part on receiving the conflict indication, a collision monitoring procedure that is associated with the second RAT and causes the UE to calculate at least a collision metric that is associated with the first RAT and the second RAT, the collision metric being based at least in part on a signal measurement occasion that is associated with generating a mobility measurement metric, the mobility measurement metric being associated with the second RAT. The set of instructions, when executed by one or more processors of the UE, may cause the UE to selectively calculate the mobility measurement metric based at least in part on a frequency conflict duration, the signal measurement occasion, and the collision metric.

Some aspects described herein relate to an apparatus for wireless communication. The apparatus may include means for receiving a conflict indication that indicates a frequency conflict between a first RAT supported by the UE and a second RAT supported by the UE. The apparatus may include means for performing, based at least in part on receiving the conflict indication, a collision monitoring procedure that is associated with the second RAT and comprises at least: means for calculating at least a collision metric that is associated with the first RAT and the second RAT, the collision metric being based at least in part on a signal measurement occasion that is associated with generating a mobility measurement metric, the mobility measurement metric being associated with the second RAT. The apparatus may include means for selectively calculating the mobility measurement metric based at least in part on a frequency conflict duration, the signal measurement occasion, and the collision metric.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5A and 5B are a diagram illustrating an example of a frequency coexistence management process that may be implemented by a wireless communication device, in accordance with the present disclosure.

FIG. 7 is a diagram illustrating an example process performed, for example, at a UE or an apparatus of a UE, in accordance with the present disclosure.

DETAILED DESCRIPTION

Figure 1:
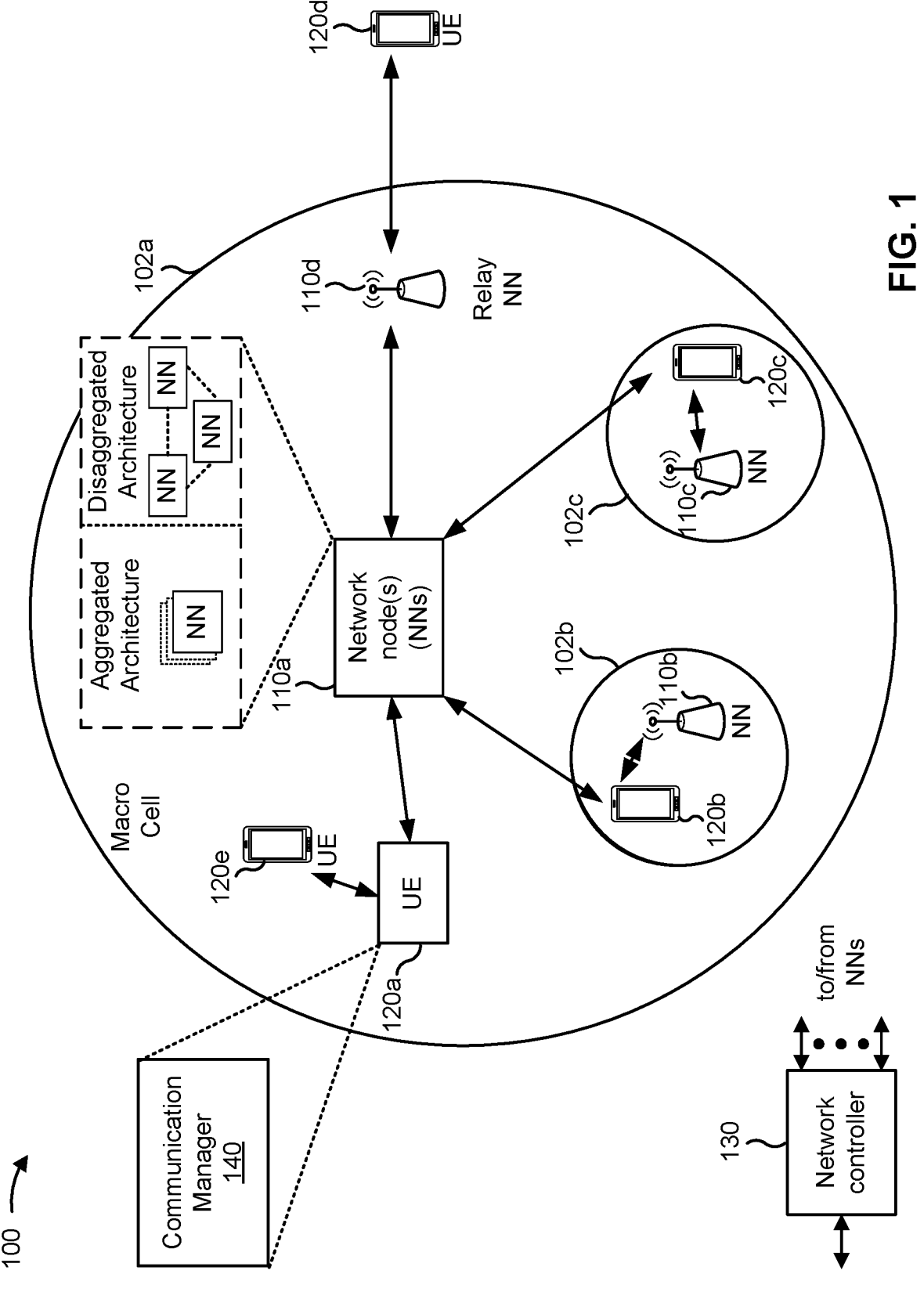
FIG. 1 is a diagram illustrating an example of a wireless network, in accordance with the present disclosure.

In some aspects, a user equipment (UE) may support multiple radio access technologies (RATs). Some frequency band combinations between the multiple RATs may result in degraded performance at the UE, such as inaccurate measurements, increased bit recovery errors, decreased data throughput, and/or increased data transfer latencies. To illustrate, a transmission by the UE that is configured for a first RAT may desense (e.g., decrease a sensitivity) a receiver at the UE that is tuned to receive a second transmission that is configured for a second RAT. The desensed receiver may result in reception inaccuracies, inaccurate measurements, and/or corrupt measurements. At times, a UE may use an inaccurate and/or corrupt measurement metric to make an operating decision at the UE, such as an operating decision associated with performing a voice call handover from a first RAT to a second RAT and/or an operating decision associated with positioning. Using a corrupt measurement metric to make an operating decision may result in the UE making an inaccurate operating decision and, consequently, failure of an operation at the UE, such as a failed voice call handover operation and/or a failed positioning operation.

Various aspects described herein generally relate to mitigating frequency collisions in a measurement. Some aspects relate more specifically to a UE performing a collision detection procedure that mitigates generating a measurement metric using a compromised signal, such as a signal that is received via a desensed receiver. In some aspects, a UE may receive a conflict indication that indicates a frequency conflict between a first RAT supported by the UE and a second RAT supported by the UE. As one example, a coexistence (coex) manager at the UE may receive first frequency configuration information that is associated with the first RAT and second frequency configuration information that is associated with the second RAT. In some aspects, the coex manager may identify that the first frequency configuration information and the second frequency configuration information indicate that a transmission associated with the first RAT at least partially overlaps with a frequency band that is associated with the second RAT, examples of which are provided below. Based at least in part on receiving the conflict indication, the UE may perform a collision monitoring procedure that is associated with the second RAT. The collision monitoring procedure may include calculating a collision metric that is associated with the first RAT and the second RAT, such as a collision metric that is based at least in part on a signal measurement occasion used to generate a mobility measurement metric of the second RAT and/or a presence of a transmission associated with the first RAT during the signal measurement occasion. Alternatively, or additionally, the collision monitoring procedure may include selectively calculating the mobility measurement metric based at least in part on a frequency conflict duration, the signal measurement occasion, and/or the collision metric as described below.

The indication of a frequency conflict between a first RAT and a second RAT may enable a UE to mitigate calculating a measurement metric using a corrupted signal. For example, a UE that receives an indication of a frequency conflict may perform a collision detection procedure that mitigates the UE generating an inaccurate and/or corrupted measurement metric (e.g., using a corrupted signal that is based at least in part on a desensed receiver). An example corrupted signal may include a receive signal associated with a second RAT that is a victim signal of a transmission that is associated with a first RAT (e.g., an aggressor signal) that occurs during the signal measurement occasion. That is, the corrupted signal may be based at least in part on a frequency collision between a first RAT transmission and a second RAT reception. Mitigating the use of an inaccurate and/or corrupted measurement metric to make an operating decision may result in the UE making more accurate operating decisions and, consequently, successful completion of an operation at the UE.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) RAT, aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include midband frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., a UE 120) may include a communication manager 140. As described in more detail elsewhere herein, the communication manager 140 may receive a conflict indication that indicates a frequency conflict between a first RAT supported by the UE and a second RAT supported by the UE; perform, based at least in part on receiving the conflict indication, a collision monitoring procedure that is associated with the second RAT and comprises at least: calculating at least a collision metric that is associated with the first RAT and the second RAT, the collision metric being based at least in part on a signal measurement occasion that is associated with generating a mobility measurement metric, the mobility measurement metric being associated with the second RAT; and selectively calculate the mobility measurement metric based at least in part on a frequency conflict duration, the signal measurement occasion, and the collision metric. Additionally, or alternatively, the communication manager 140 may perform one or more other operations described herein.

As indicated above, FIG. 1 is provided as an example. Other examples may differ from what is described with regard to FIG. 1.

Figure 2:
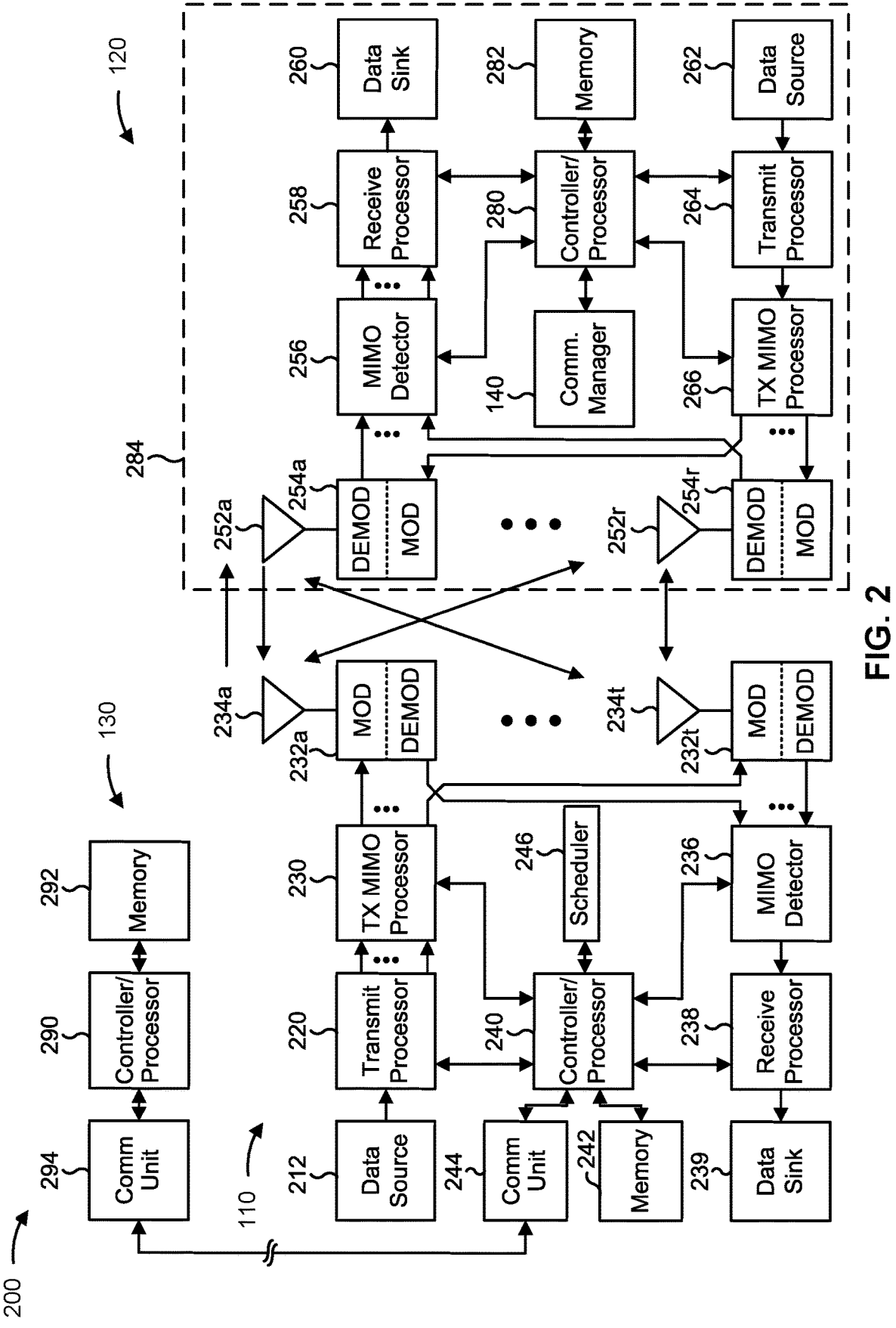
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4A-8).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4A-8).

The controller/processor 240 of the network node 110, the controller/processor 280 of the UE 120, and/or any other component(s) of FIG. 2 may perform one or more techniques associated with mitigating a frequency collision in a measurement metric, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, and/or other processes as described herein. In some examples, executing instructions may include running the instructions, converting the instructions, compiling the instructions, and/or interpreting the instructions, among other examples.

In some aspects, a UE (e.g., the UE 120) includes means for receiving a conflict indication that indicates a frequency conflict between a first RAT supported by the UE and a second RAT supported by the UE; means for performing, based at least in part on receiving the conflict indication, a collision monitoring procedure that is associated with the second RAT and comprises at least: means for calculating at least a collision metric that is associated with the first RAT and the second RAT, the collision metric being based at least in part on a signal measurement occasion that is associated with generating a mobility measurement metric, the mobility measurement metric being associated with the second RAT; and/or means for selectively calculating the mobility measurement metric based at least in part on a frequency conflict duration, the signal measurement occasion, and the collision metric. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
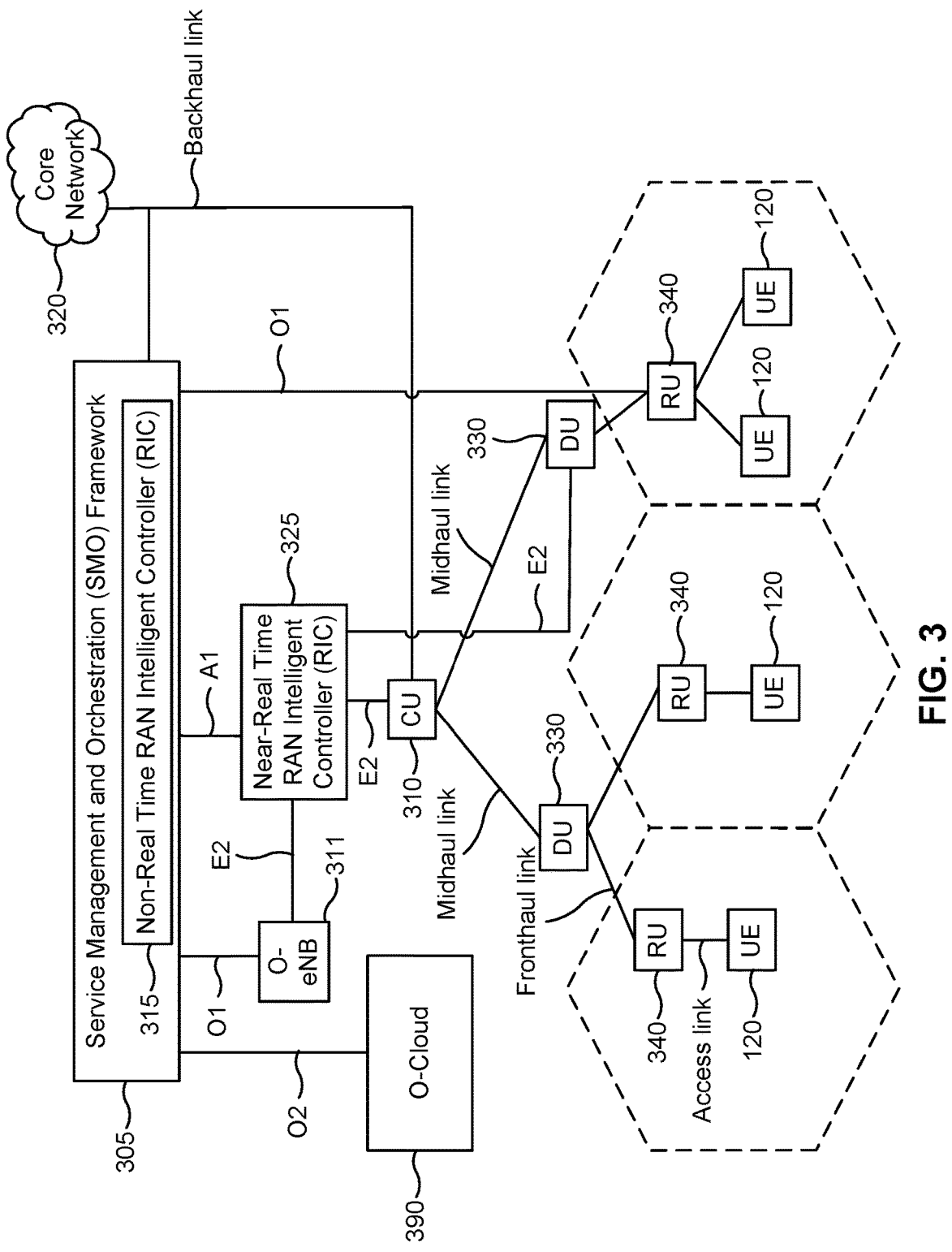
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figures 4A, 4B:
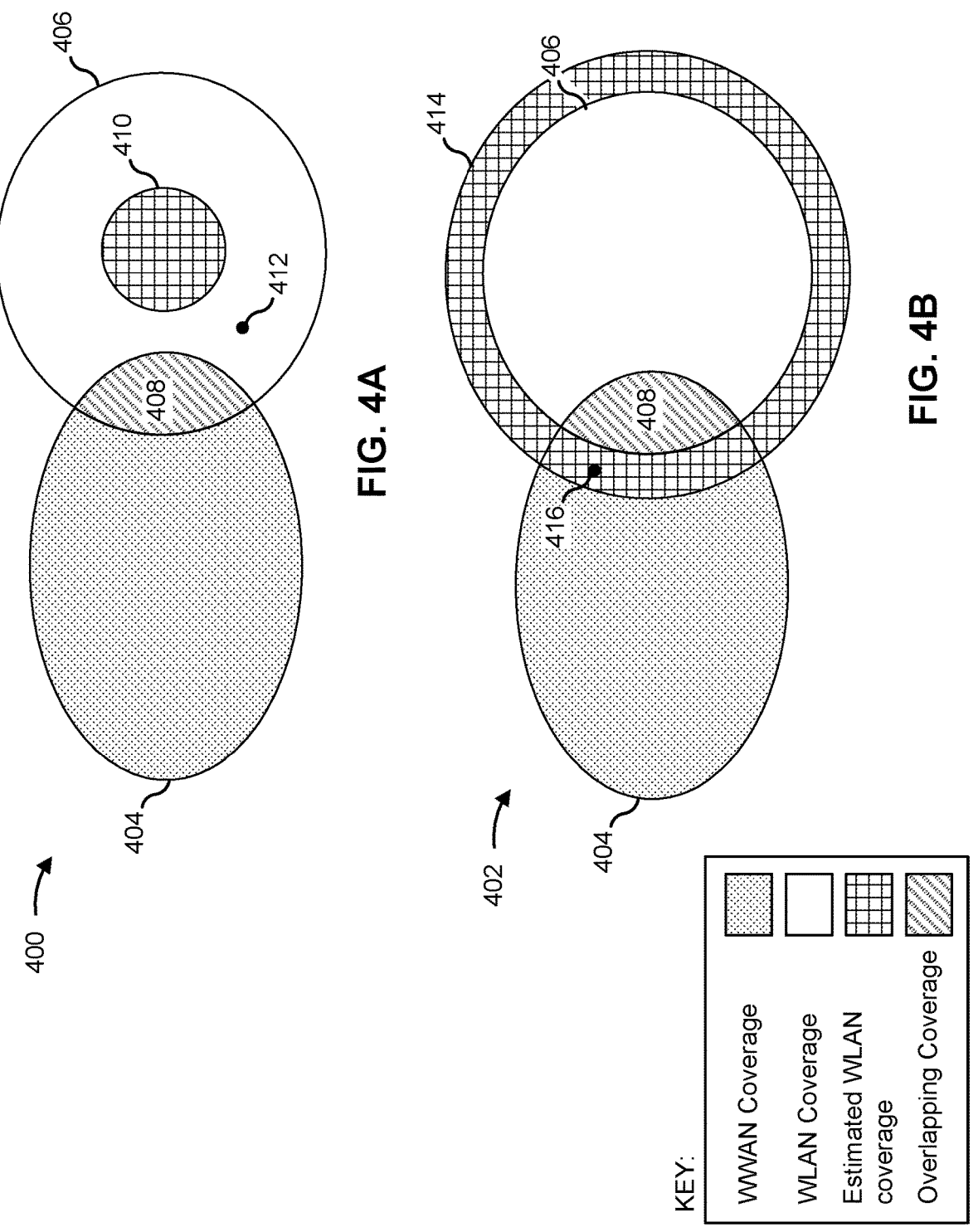
FIGS. 4A and 4B are diagrams illustrating a first example and a second example, respectively, of an estimated wireless coverage area relative to an actual wireless coverage area, in accordance with the present disclosure.

FIGS. 4A and 4B are diagrams illustrating a first example 400 and a second example 402, respectively, of an estimated wireless coverage area relative to an actual wireless coverage area, in accordance with the present disclosure.

In some aspects, a UE may support multiple RATs, such as a wireless wide area network (WWAN) RAT (e.g., 5G NR) and a WLAN RAT. Some frequency band combinations between the multiple RATs may result in degraded performance at the UE, such as inaccurate measurements, increased bit recovery errors, decreased data throughput, and/or increased data transfer latencies. One such example is the coexistence of an N104 band associated with 5G NR with a 5 GHz WLAN band at the UE. To illustrate, an N104 band transmission (e.g., a transmission within the N104 frequency band) by the UE may desense (e.g., decrease a sensitivity) a receiver at the UE that is tuned for WLAN 5 GHz band reception, resulting in reception inaccuracies (e.g., corruption to the received signal). Alternatively, or additionally, a WLAN 5 GHZ band transmission by the UE may desense a receiver at the UE that is tuned for N104 band reception. In each case, the transmission may be referred to as an aggressor signal, and the received signal may be referred to as a victim signal.

Reception inaccuracies may result in inaccurate measurement results and/or corrupt measurements. As one example, a WWAN transmission by the UE that occurs contemporaneously and/or during a WLAN channel measurement being performed and/or calculated by the UE may result in a corrupted WLAN channel measurement metric. To illustrate, the received WLAN signal may be corrupted based at least in part on the receiver at the UE being desensed (e.g., based at least in part on the contemporaneous WWAN transmission), and the UE may calculate an inaccurate and/or corrupted WLAN channel measurement metric using the corrupted WLAN signal.

In some aspects, the UE may use the inaccurate measurement metric to make an operating decision at the UE, such as an operating decision associated with performing a handover from a first RAT (e.g., a WWAN) to a second RAT (e.g., a WLAN), a positioning operating decision, a cell acquisition operating decision, a neighbor cell search operating decision, a tracking loop operating decision, and/or a link management operating decision. To illustrate, a UE (e.g., a UE 120) may operate with an active voice call (e.g., a voice-over-Internet Protocol (VOIP) call and/or a voice-over-WWAN call) based at least in part on using the WWAN to establish and/or maintain the voice call. In some aspects, the UE may monitor a channel condition associated with the voice call to determine whether to perform a voice call handover procedure. That is, the UE may autonomously determine to switch from using the WWAN for maintaining the voice call to using the WLAN for maintaining the voice call. For example, the UE may generate one or more measurement metrics (e.g., channel condition metrics) that are associated with a target of the voice call handover and/or one or more measurement metrics that are associated with a source of the voice handover. The UE may analyze the measurement metrics to make a determination of when to change from using the WWAN as a source for the voice call (e.g., a source for transmitting voice data to and/or receiving voice data from a connected device) to using the WLAN as the source for the voice call. As one example, a first measurement metric associated with the WLAN may satisfy a handover threshold and/or a second measurement metric associated with the WLAN may fail to satisfy a quality threshold. Accordingly, the UE may trigger a voice call handover from a first RAT to a second RAT based at least in part on a channel quality that is indicated by a measurement metric.

Inaccurate and/or corrupt measurement metric(s) may result in the UE making inaccurate operating decisions and, consequently, a failed operation at the UE, such as a failed voice call handover operation. To illustrate, the first example 400 shown by FIG. 4A includes a first coverage area 404 (shown with a dotted pattern) associated with a first RAT (e.g., a WWAN) and a second coverage area 406 (shown with a solid white pattern) associated with a second RAT (e.g., a WLAN). The first coverage area 404 may overlap with at least a portion of the second coverage area 406, as shown by reference number 408 and a diagonal pattern. In some aspects, a UE may estimate the first coverage area 404 and/or a boundary of the first coverage area 404 based at least in part on one or more measurement metrics (e.g., channel condition measurement metric(s)) associated with the first RAT. Alternatively, or additionally, the UE may estimate the second coverage area 406 and/or a boundary of the second coverage area 406 based at least in part on one or more measurement metrics associated with the second RAT. To illustrate, the UE may determine that a first location that is associated with a strong RSSI measurement is near a center of a coverage area, and that a second location that is associated with a weak RSSI measurement metric is near a boundary of the coverage area.

An inaccurate and/or corrupt measurement metric may result in the UE incorrectly estimating the boundary of a coverage area. For instance, based at least in part on using corrupted measurement metric(s), the UE may calculate an estimated coverage area 410 (shown with a square pattern) that is an underestimation of the second coverage area 406. In some aspects, an underestimation of a coverage area may result in a link failure. To illustrate, at point 412, the UE may be outside of the first coverage area 404 associated with the WWAN. Based at least in part on the incorrect estimated coverage area 410, the UE may incorrectly determine that WLAN coverage is not present and/or may determine to not trigger and/or perform a voice call handover to the WLAN. Accordingly, the UE may make an incorrect operating decision that results in a link drop and/or a call drop. While the example 400 describes an underestimation of a WLAN coverage area WLAN, alternate or additional examples may include an underestimation of a WWAN coverage area.

The second example 402 shown by FIG. 4B includes the first coverage area 404 associated with the first RAT (e.g., the WWAN), the second coverage area 406 associated with the second RAT (e.g., the WLAN), and an overlap between the first coverage area 404 and the second coverage area 406, as shown by reference number 408 and a diagonal pattern. In some aspects, based at least in part on a corrupt measurement, a UE may calculate an estimated coverage area 414 that is an overestimation of the second coverage area 406, and the overestimation may result in a link failure. To illustrate, at point 416 and based at least in part on a corrupt measurement metric, the UE may trigger a premature handover from the WWAN to the WLAN. That is, the UE may determine to perform a handover to the WLAN at a location that does not have WLAN coverage, and the voice call handover may fail, resulting in a link drop and/or a call drop.

A UE supporting multiple RATs may result in a transmission associated with a first RAT acting as an aggressor signal to a received signal associated with a second RAT (e.g., a victim signal). As described above, a measurement metric that is calculated based at least in part on a UE using a victim signal may be inaccurate and/or corrupted. Using a corrupt measurement metric to make an operating decision may result in the UE making an inaccurate operating decision and, consequently, a failed operation at the UE.

Some techniques and apparatuses described herein provide mitigating frequency collisions in a measurement. In some aspects, a UE may receive a conflict indication that indicates a frequency conflict between a first RAT supported by the UE and a second RAT supported by the UE. As one example, a coexistence (coex) manager at the UE may receive first frequency configuration information that is associated with the first RAT and second frequency configuration information that is associated with the second RAT. In some aspects, the first frequency configuration information and the second frequency configuration information indicate that a transmission associated with the first RAT at least partially overlaps with a frequency band that is associated with the second RAT, examples of which are provided below. Based at least in part on receiving the conflict indication, the UE may perform a collision monitoring procedure that is associated with the second RAT, such as a collision monitoring procedure that identifies a potential frequency conflict and/or a potential frequency collision that may occur during a signal measurement occasion. "Signal measurement occasion" may denote a duration during which the UE may receive a signal that is used for calculating a measurement metric, such as a mobility measurement metric and/or a channel condition mature. In some aspects, the collision monitoring procedure may include calculating a collision metric that is associated with the first RAT and the second RAT. As one example, a collision metric may be based at least in part on a signal measurement occasion used to generate a mobility measurement metric of the second RAT and/or a presence of a transmission associated with the first RAT during the signal measurement occasion. Alternatively, or additionally, the collision monitoring procedure may include selectively calculating the mobility measurement metric based at least in part on a frequency conflict duration, the signal measurement occasion, and the collision metric, as described below.

The indication of a frequency conflict between a first RAT and a second RAT may enable a UE to mitigate calculating a measurement metric using a corrupted signal. For example, a UE that receives an indication of a frequency conflict may perform a collision detection procedure that mitigates the UE generating an inaccurate and/or corrupted measurement metric (e.g., using a corrupted signal that is based at least in part on a desensed receiver). Mitigating the calculation of an inaccurate and/or corrupted measurement metric may mitigate the UE making an inaccurate operating decision and, consequently, may result in a successful operation performed by the UE.

Alternatively, or additionally, in some aspects, the use of a coex manager, the indication of a frequency conflict, and/or the collision detection procedure may provide a more cost-effective and/or affordable solution for mitigating corrupt measurement metrics relative to a hardware filter that isolates an aggressor transmission from a victim receiver. As one example, the inclusion of a hardware isolation filter may increase a cost and/or complexity of building a UE, relative to a software and/or firmware algorithm that implements at least some aspects of the coex manager, the indication of the frequency conflict, and/or the collision detection procedure. For example, a software and/or firmware algorithm that implements at least some aspects of the coex manager may provide a less complex and/or less expensive solution for managing the coexistence of multiple RATs in a single device relative to a hardware isolation filter.

As indicated above, FIGS. 4A and 4B is provided as examples. Other examples may differ from what is described with regard to FIGS. 4A and 4B.

FIGS. 5A and 5B are a diagram illustrating an example 500 of a frequency coex management process that may be implemented by a wireless communication device (shown as a UE 120), in accordance with the present disclosure. For clarity, the example 500 includes a coex manager 502, a first RAT manager (shown as WWAN manager 504), and a second RAT manager (shown as WLAN manager 506) that are implemented by the wireless communication device, such as by using any combination of software, firmware, and/or hardware as described herein. However, other examples may include alternate or additional partitioning of the functionality described with regard to the example 500. That is, the functionality described with regard to the example 500 may be implemented using alternate or additional partitions relative to the coex manager 502, the first RAT manager, and the second RAT manager. Further, while the example 500 describes aspects of the present disclosure as using a WWAN as the first RAT and a WLAN as the second RAT, other examples may be based at least in part on alternate or additional RATs. One or more operations performed by the WWAN manager 504 as described with regard to the example 500 may be performed by the WLAN manager 506 (and/or vice versa).

As shown by reference number 510, a WWAN manager 504 may communicate a first registration message to a coex manager 502. The WWAN manager 504 may communicate with the coex manager 502 using any combination of communication mechanisms, such as an inter-process communication (IPC) mechanism, shared memory, message passing, a function call, a communication protocol (e.g., sockets), and/or an interrupt. As one non-limiting example, the WWAN manager 504 and the coex manager 502 may be implemented based at least in part on different threads, and the WWAN manager 504 may communicate the registration message using an IPC mechanism, such as a semaphore, a queue message, and/or a pipe. As another non-limiting example, the WWAN manager 504 and the coex manager 502 may be implemented based at least in part on object-oriented programming, and the WWAN manager 504 may call a function that registers a WWAN manager object with a coex manager object. Accordingly, "message" may denote any suitable type of communication mechanism within a device to communicate information. In some aspects, the first registration message may indicate information about the WWAN manager 504, such as a RAT type associated with the WWAN manager 504, an identifier associated with the WWAN manager 504, and/or an operating state of the WWAN manager 504 (e.g., active, inactive, initialized, and/or uninitialized).

As shown by reference number 512, the WWAN manager 504 may communicate an indication of first communication configuration information to the coex manager 502. The first communication configuration information may indicate one or more parameters that may describe a configuration of one or more communication links (e.g., active and/or established communication links) associated with the WWAN manager 504, such as a frequency band and/or a carrier frequency.

As shown by reference number 514, a WLAN manager 506 may communicate a second registration message to the coex manager 502. The WLAN manager 506 may communicate the second registration message to the coex manager 502 using any suitable communication mechanisms as described above, such as an IPC mechanism, shared memory, message passing, a function call, a communication protocol, and/or an interrupt. In some aspects, the second registration message may indicate information about the WLAN manager 506, such as a RAT type, an identifier, and/or an operating state.

As shown by reference number 516, the WLAN manager 506 may communicate an indication of second communication configuration information to the coex manager 502. In a similar manner as described above, the second communication configuration information may indicate one or more parameters that may describe a configuration of one or more communication links (e.g., active and/or established communication links) associated with the WLAN manager 506, such as a frequency band and/or a carrier frequency used to implement the communication link(s).

As shown by reference number 518, the coex manager 502 may analyze the first communication configuration information and/or the second communication configuration information to identify whether a conflict exists between the WWAN manager 504 and the WLAN manager 506, such as a frequency conflict. In some aspects, the coex manager 502 may identify a frequency conflict by analyzing the first communication configuration and the second communication configuration. Accordingly, the coex manager 502 may receive information that indicates a frequency conflict based at least in part on receiving the first communication configuration information and the second communication configuration information. To illustrate, the first communication configuration information may indicate one or more transmission parameters that are used by the WWAN manager 504 to generate a WWAN transmission, and the second communication configuration information may indicate a frequency band (e.g., a reception frequency band) that is used by the WLAN manager 506 to generate a mobility measurement metric used by a UE to make an operating decision, such as a mobility measurement metric that is used to make a decision regarding whether or not to perform a handover.

In some aspects, the first communication configuration information and the second communication configuration information may indicate that a transmission associated with the WWAN at least partially overlaps with a frequency band (e.g., a reception frequency band) that is associated with the WLAN (or vice versa). The transmission associated with the WWAN may at least partially overlap with the frequency band associated with the WLAN in a variety of manners. Some non-limiting examples may include a first frequency band that is associated with the WWAN transmission may partially overlap with a second frequency band that is associated with the WLAN reception during a signal measurement occasion, TX noise that is associated with the WWAN transmission at least partially overlapping with the second frequency band, and/or a TX signal that is based at least in part on the WWAN transmission acting as a jammer to the second frequency band. As another non-limiting example, a harmonic associated with the WWAN transmission may at least partially overlap with, and/or occur within, the second frequency band used for WLAN reception during the signal measurement occasion. Alternatively, or additionally, an intermodulation signal associated with the WWAN transmission may at least partially overlap with the second frequency band that is associated with the WLAN reception during the signal measurement occasion. Accordingly, in some aspects, the first communication information and the second communication information may indicate a frequency conflict that is associated with receiver hardware becoming desensed based at least in part on a first RAT transmission that occurs during at least part of a signal measurement occasion associated with a second RAT. In other aspects, the first communication information and the second communication configuration indication may indicate that no conflict exists between the first RAT and the second RAT.

As shown by reference number 520, the WWAN manager 504 may initialize a wireless procedure. To illustrate, the WWAN manager 504 may initialize a voice call that operates based at least in part on using a (wireless) communication link. Alternatively, or additionally, the WWAN manager 504 may begin participating in, managing, and/or facilitating the voice call. As at least part of the wireless procedure, the WWAN manager 504 may commence a mobility management procedure that includes calculating one or more channel condition metrics associated with a wireless channel that is used by a wireless communication link, that may characterize a condition and/or state of a wireless channel associated with the communication link. In some aspects, the WWAN manager 504 may communicate the start of the mobility management procedure to the coex manager 502, while in other aspects, the WWAN manager may refrain from notifying the coex manager 502 that the mobility management procedure by the WWAN manager 504 has commenced.

As shown by reference number 522, the WWAN manager 504 may identify a poor channel condition. To illustrate, the WWAN manager 504 may compare a channel condition metric (e.g., calculated as part of the wireless procedure) to a threshold as a way to identify poor channel conditions. For instance, the WWAN manager 504 may calculate and compare an RSRP metric to a first power threshold, a block error rate (BLER) metric to an error threshold, and/or a signal-to-noise ratio (SNR) metric to a second power threshold. In some aspects, the various thresholds may be based at least in part on a transmission configuration. As one example, the second power threshold associated with the SNR metric may be based at least in part on an MCS configuration. That is, the second power threshold used by the UE to evaluate an SNR metric may have different values for different MCS configurations. The WWAN manager 504 may identify a poor channel condition based at least in part on one or more channel condition metrics satisfying a first respective threshold (e.g., a first threshold that is associated with the metric type) and/or failing to satisfy a second respective threshold (e.g., a second threshold that is associated with the metric type). Accordingly, the WWAN manager 504 may identify a poor channel condition using one or more WWAN channel condition metrics and/or one or more thresholds. Based at least in part on identifying a poor channel condition, the WWAN manager 504 may decide to activate a mobility measurement procedure that uses a second RAT, such as by indicating a request to activate a mobility measurement procedure that is associated with and/or managed by the WLAN manager 506.

As shown by reference number 524, the WWAN manager 504 may communicate a mobility activation indication to the coex manager 502. In a similar manner as described above, the coex manager 502 may receive the mobility activation indication using one or more communication mechanisms. In some aspects, the mobility activation indication may be a generic mobility activation indication that does not specify a preferred RAT, while in other aspects, the mobility activation indication may specify a preferred RAT. That is, the WWAN manager 504 may indicate to activate a mobility procedure that is associated with a preferred RAT, or may refrain from indicating a preferred RAT, with the mobility activation indication.

As shown by reference number 526, the coex manager 502 may communicate a mobility activation indication to the WLAN manager 506. In a similar manner as described above, the WLAN manager 506 may receive the mobility activation indication using any communication mechanism. In some aspects, the coex manager 502 may select a particular RAT manager to forward the mobility activation indication, such as by selecting the particular RAT manager form registered with the coex manager 502. Alternatively, or additionally, the coex manager 502 may forward the mobility activation indication to a RAT manager that is indicated by the WWAN manager 504 (e.g., a preferred RAT manager). In some aspects, the coex manager 502 may validate that a RAT indicated by WWAN manager 504 (e.g., by the mobility activation indication) is registered with the coex manager 502 prior to communicating the mobility activation indication to the WLAN manager 506.

As shown by reference number 528, the WLAN manager 506 may initialize a mobility measurement procedure. In some aspects, and as at least part of the mobility measurement procedure, the WLAN manager 506 may commence calculating one or more channel condition metrics that are associated with the WLAN RAT. For example, the WLAN manager 506 may begin calculating, as a channel condition metric, an RSSI measurement that is based at least in part on a frequency band associated with WLAN (e.g., a frequency band indicated by the second communication configuration information). To illustrate, the WLAN manager 506 may calculate the channel condition metric using a signal received within the frequency band.

As shown by reference number 530, the WWAN manager 504 may identify a first WWAN TX occasion. For instance, the WWAN manager 504 may identify a pending and/or future voice transmission by the WWAN manager 504. Based at least in part on identifying the first WWAN TX occasion, the WWAN manager 504 may communicate a first TX indication (e.g., a WWAN TX indication that specifies WWAN transmission activity) to the coex manager 502 as shown by reference number 532, and the first TX indication may indicate that a transmission activity associated with WWAN is occurring and/or is scheduled to occur. In some aspects, one or more parameters associated with the transmission activity may be indicated by the first communication configuration as described with regard to reference number 512. Alternatively, or additionally, and in a similar manner as described above, the WWAN manager 504 may communicate, and the coex manager 502 may receive, the first TX indication via one or more communication mechanisms.

As shown by reference number 534, the coex manager 502 may communicate the first TX indication (e.g., a WWAN TX indication) to the WLAN manager 506. In similar manner as described above, the coex manager 502 may communicate, and the WLAN manager 506 may receive, the first TX indication via one or more communication mechanisms. In some aspects, the coex manager 502 may communicate the first TX indication to indicate, to the WLAN manager 506, that a frequency conflict and/or frequency collision potentially exists with a transmission associated with the WWAN manager 504. Alternatively, or additionally, the coex manager 502 may communicate the first TX indication to instruct the WLAN manager 506 to commence a conflict monitoring procedure. In some aspects, the coex manager 502 may communicate the first TX indication based at least in part on identifying a frequency conflict between the WWAN and the WLAN, as described with regard to reference number 518. Alternatively, or additionally, the coex manager 502 may refrain from communicating the first TX indication to the WLAN manager 506 based at least in part on not identifying that a frequency conflict exists between the WWAN and the WLAN. Accordingly, the coex manager 502 communicating the first TX indication may implicitly indicate a frequency conflict and/ or to commence a collision monitoring procedure. Alternatively, or additionally, the coex manager 502 may communicate an instruction to commence the collision monitoring procedure, and the instruction may implicitly indicate the pending TX activity associated with the WWAN.

As shown by designator A, the frequency coex management process proceeds from FIG. 5A to FIG. 5B. As shown by reference number 536, the WLAN manager 506 may activate and/or commence performing a collision monitoring procedure, as described in more detail below with regard to FIG. 6. In some aspects, the WLAN manager 506 may activate the collision monitoring procedure based at least in part on receiving the TX indication, such as in scenarios where the TX indication implicitly indicates that a potential frequency conflict exists and/or indicates an instruction to commence the collision monitoring procedure, as described above. Accordingly, the WLAN manager 506 may activate and/or perform the collision monitoring procedure to monitor for a WWAN transmission that may potentially corrupt a WLAN channel condition metric (e.g., by desensing a receiver).

Performing the collision monitoring procedure may include the WLAN manager 506 calculating a collision metric that indicates a potential of a WWAN transmission at least partially overlapping with a WLAN receive frequency band during a signal measurement occasion. Accordingly, the collision metric calculated by the WLAN manager 506 may be used by the WLAN manager 506 to identify a potential frequency collision between a WWAN transmission and a WLAN signal measurement occasion. Some non-limiting examples of a collision metric may include a percentage of collisions over a measurement duration (e.g., a signal measurement occasion), a location of one or more collisions over the measurement duration, and/or an impact of collision (e.g., an amount of degradation observed on the mobility measurement metric associated with second RAT due to the first RAT's transmission). To illustrate, the WLAN manager 506 may calculate the percentage of collisions based at least in part on using the formula:

$$\% \text{ of collisions} = \frac{x}{T} * 100 \tag{1}$$

where x represents a collision duration and T is a measurement duration (e.g., a signal measurement occasion). Alternatively, or additionally, the WLAN manager 506 may partition a measurement duration (e.g., a signal measurement occasion) into multiple sub-durations, such as a warm up sub-duration, a sample capture sub-duration, a gap sub-duration, and/or a cool down sub-duration. In some aspects, the WLAN manager 506 may calculate a collision metric based at least in part on calculating, measuring, and/or identifying one or more collisions that occur during a sample capture sub-duration. The WLAN manager 506 may discard and/or not calculate collision(s) that occur in other sub-durations. In some aspects, the WLAN manager 506 may calculate, as an impact of collision, an amount of degradation (e.g., in decibels (dB)) that is observed on the mobility measurement metric (e.g., the WLAN mobility metric) due to the WWAN transmission.

Alternatively, or additionally, performing the collision monitoring procedure may include selectively calculating a mobility measurement metric, such as selectively calculating the mobility measurement metric based at least in part on any combination of a frequency conflict duration (e.g., a duration during which the WWAN transmission may at least partially overlap with the WLAN receive frequency band), the signal measurement occasion (e.g., the WLAN signal measurement occasion), and the collision metric. As one example, the WLAN manager 506 may refrain from calculating a mobility measurement metric that may use a signal that the UE 120 receives during at least part of the frequency conflict duration (e.g., a point in time that occurs in the frequency conflict duration) based at least in part on the collision metric indicating that a frequency conflict exists and/or based at least in part on a portion of the frequency conflict duration overlapping with a signal measurement occasion. As another example, the WLAN manager 506 may calculate a mobility measurement metric that uses the signal that the UE 120 receives during at least a portion of the frequency conflict duration (e.g., a point in time that occurs in the frequency conflict duration) and discard the mobility measurement metric based at least in part on the collision metric indicating a presence of the frequency conflict.

In some cases, the WLAN manager 506 may calculate the frequency conflict duration based at least in part on receiving one or more indications from the WWAN manager 504 (e.g., via the coex manager 502). To illustrate, and as shown by reference number 538, the WWAN manager 504 may communicate a TX stop indication (shown as a WWAN TX stop indication) to the coex manager 502, and the TX stop indication may indicate that a transmission activity associated with WWAN has stopped and/or is scheduled to stop, such as the transmission activity indicated as described with regard to reference number 532 and reference number 534. As shown by reference number 540, the coex manager 502 may communicate the TX stop indication (e.g., a WWAN TX stop indication) to the WLAN manager 506. In similar manner as described above, the coex manager 502 may communicate, and the WLAN manager 506 may receive, the TX stop indication via one or more communication mechanisms. In some aspects, the WLAN manager 506 may calculate a frequency conflict duration using the TX indication as described with regard to reference number 534 and/or the TX stop indication as described with regard to reference number 540. For instance, and using the TX indication and the TX stop indication, the WLAN manager 506 may calculate an overlap duration (e.g., the frequency conflict duration) that is associated with the WWAN transmission activity overlapping with a signal measurement occasion.

Accordingly, and as shown by reference number 542, the WLAN manager 506 may calculate a mobility measurement metric (e.g., a WLAN mobility measurement metric). For example, the collision monitoring procedure described with regard to FIG. 6 may identify that the signal measurement occasion and/or a sub-duration of the signal measurement occasion does not overlap with the frequency conflict duration. Accordingly, the collision monitoring procedure may indicate a presence of a clean signal (e.g., that is not based at least in part on a frequency collision), and the WLAN manager 506 may calculate a mobility measurement metric (e.g., a WLAN mobility measurement metric). However, in other examples and as described below with regard to reference number 552 and FIG. 6, the WLAN manager 506 may identify a collision exists and/or may alternatively or additionally communicate a request to modify a WWAN transmission.

As shown by reference number 544, the WWAN manager 504 may identify a second WWAN TX occasion in a similar manner as described with regard to reference number 530. In some aspects, the second WWAN TX occasion may be a separate TX occasion relative to the first WWAN TX occasion. Accordingly, and as shown by reference number 546, the WWAN manager 504 may communicate a second TX indication to the coex manager 502. The WWAN manager 504 may communicate, and the coex manager 502 may receive, the second TX indication via one or more communication mechanisms, examples of which are provided above. Accordingly, and as shown by reference number 548, the coex manager 502 may communicate the second TX indication to the WLAN manager 506.

As shown by reference number 550, the WLAN manager 506 may perform a collision monitoring procedure. In performing the collision monitoring procedure, the WLAN manager 506 may continue the collision monitoring procedure performed as described with regard to reference number 536 and/or may activate a new instance of the collision monitoring procedure. That is, the collision monitoring procedure described with regard to reference number 550 may be a subsequent iteration of the collision monitoring procedure described with regard to reference number 536 and/or may be a separate instance of the collision monitoring procedure.

Figure 6:
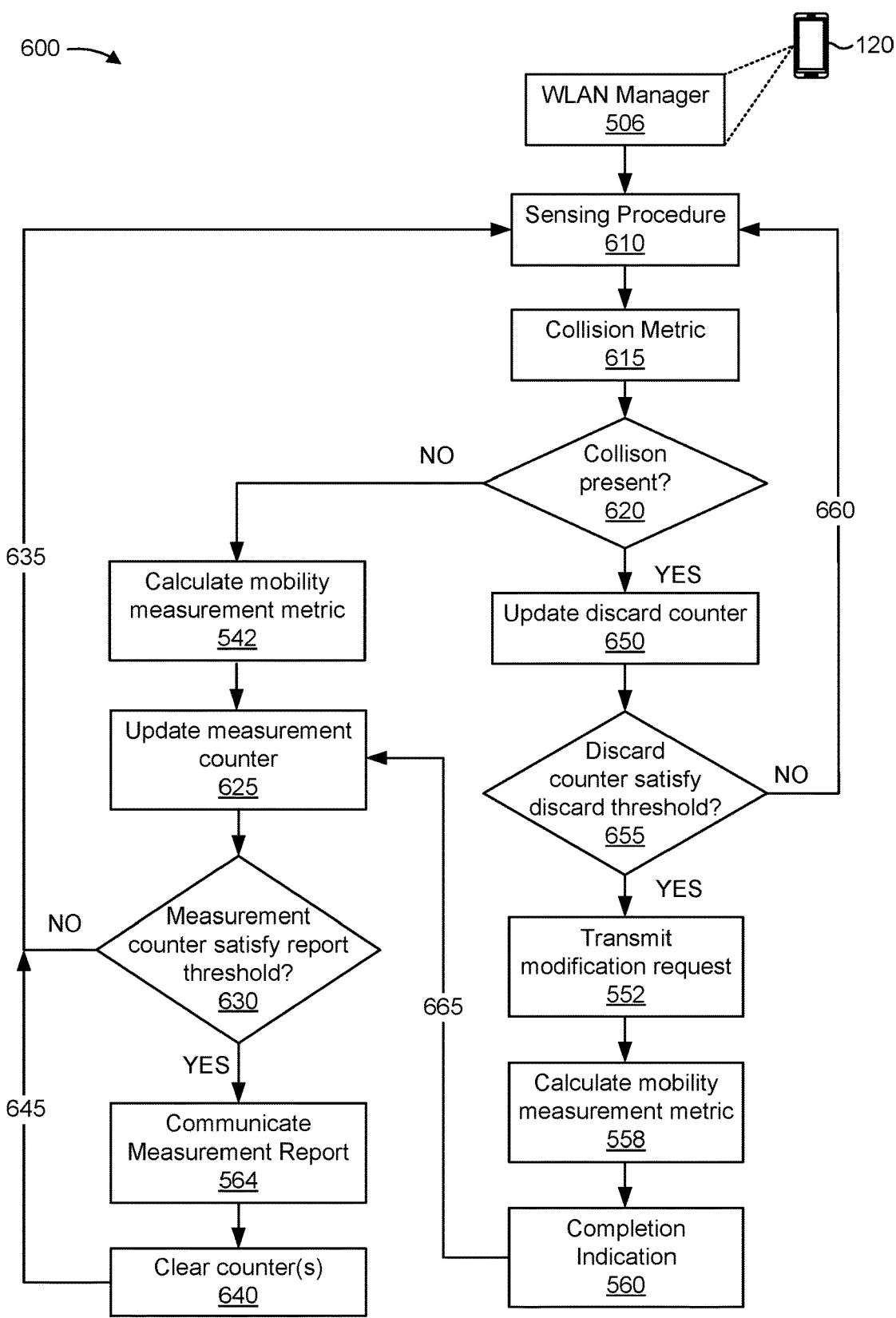
FIG. 6 is a diagram illustrating an example of collision monitoring procedure that may be implemented by a wireless communication device, in accordance with the present disclosure.

In some aspects, portions of the collision monitoring procedure performed as described with regard to reference number 536 may be used by the WLAN manager 506 in performing the collision monitoring procedure as described with regard to reference number 550. To illustrate, initially performing the collision monitoring procedure may initialize one or more counters (e.g., a measurement counter that tracks a number of calculated mobility measurement metrics and/or a discard counter that tracks a skipped and/or discarded measurement) to zero, and update the counter(s) as described with regard to FIG. 6. Performing a subsequent iteration of the collision monitoring procedure and/or a separate instance of the collision monitoring procedure may not reinitialize the counter(s) to zero and/or may use the respective updated value for the counter(s) as shown by FIG. 6.

As shown by reference number 552, the WLAN manager 506 may communicate a transmission modification request to the coex manager 502. To illustrate, and as described with regard to FIG. 6, the collision monitoring procedure may calculate that a discard counter satisfies a discard threshold and, based at least in part on the discard counter satisfying the discard threshold, the WLAN manager 506 may communicate a transmission modification request to initiate a transmission modification procedure that is associated with the WWAN. That is, the WLAN manager 506 may request, by way of the coex manager 502, that the WWAN manager initiate a transmission modification procedure, such as a transmission blanking procedure (e.g., stopping transmission) and/or a transmission backoff procedure (e.g., suspending transmission for a predetermined amount of time).

As shown by reference number 554, the coex manager 502 may communicate a transmission modification request to the WWAN manager 504. Based at least in part on receiving the transmission modification request, the WWAN manager 504 may perform a transmission modification procedure as shown by reference number 556. To illustrate, the WWAN manager 504 may perform a transmission blanking procedure and/or a transmission backoff procedure.

As shown by reference number 558, the WLAN manager 506 may selectively calculate a mobility measurement metric (e.g., a WLAN mobility measurement metric). In some aspects, the WLAN manager 506 may calculate the mobility measurement metric contemporaneously with the WWAN manager 504 performing the transmission modification procedure. That is, the WLAN manager 506 may calculate the mobility measurement metric during the transmission modification procedure performed by the WWAN manager 504 (e.g., during a backoff wait duration and/or while the WWAN manager 504 stops transmissions). Calculating the mobility measurement metric during the transmission modification procedure may mitigate the WLAN manager 506 calculating a corrupted and/or inaccurate mobility measurement metric by mitigating reception of a corrupted signal and/or a signal that is based at least in part on a frequency collision. Alternatively, or additionally, the WLAN manager 506 may refrain from calculating outside of the WWAN manager 504 performing the transmission modification procedure (e.g., when the WWAN manager 504 ceases performing the transmission modification procedure) and/or when a potential frequency conflict (and/or a potential frequency collision) is detected.

As shown by reference number 556, the WLAN manager 506 may communicate a completion indication to the coex manager 502. In some aspects, the completion indication may indicate an instruction to stop performing the transmission modification procedure. In some aspects, the WLAN manager 506 may communicate the completion indication based at least in part on calculating the mobility measurement metric (e.g., completion of the calculation).

As shown by reference number 562, the coex manager 502 may communicate a completion indication to the WWAN manager 504, and the completion indication may indicate and/or instruct the WWAN manager 504 to cease performing the transmission modification procedure. Accordingly, the WWAN manager 504 may resume transmitting one or more communications and/or may cease performing a backoff procedure.

As shown by reference number 564, the WLAN manager 506 may communicate a measurement report to the coex manager 502. For instance, the WLAN manager 506 may communicate a measurement report that includes one or more mobility measurement metrics and/or a mobility measurement metric that is based at least in part on multiple mobility measurements (e.g., an average mobility measurement metric and/or a median mobility measurement metric). In some aspects, the WLAN manager 506 may communicate the measurement report based at least in part on a measurement counter satisfying a threshold. Alternatively, or additionally, the WLAN manager 506 may reset a discard counter based at least in part on communicating the measurement report and/or the measurement counter satisfying the threshold. In some aspects, the WLAN manager 506 may reset the measurement counter.

As shown by reference number 566, any combination of the coex manager 502, the WWAN manager 504, and/or the WLAN manager 506 may perform an operating procedure, such as a connection handover that is associated with moving a connection from the WWAN (e.g., managed by the WWAN manager 504) to the WLAN (e.g., managed by the WLAN manager 506). To illustrate, the connection handover may be associated with a voice call and/or user data. In some aspects, the coex manager 502 may analyze the measurement report and identify that a first channel condition associated with a WLAN connection has better performance (e.g., higher RSSI) relative to a second channel condition associated with a WWAN connection. Accordingly, the coex manager 502 may make an operating decision to trigger a handover of the voice call from the WWAN to the WLAN. For example, the coex manager 502 may analyze a first channel condition metric associated with the WWAN, and conclude that the first channel condition metric fails to satisfy a quality threshold. Alternatively, or additionally, the coex manager 502 may analyze a second channel condition metric associated with the WLAN, conclude that the second channel condition satisfies the quality threshold, and determine to trigger the handover. While the coex manager 502 makes the operating decision in the example 500, other examples may include other functionality at a UE 120 making the operating decision based at least in part on input from the coex manager 502, the WLAN manager 506, and/or the WWAN manager 504.

Indicating frequency conflict between a first RAT and a second RAT and/or performing a collision monitoring procedure may enable a UE to mitigate calculating a measurement metric using a corrupted signal. Mitigating the use of a corrupted signal to calculate a measurement metric may result in the UE making a more accurate operating decision (e.g., relative to making the operating decision using a corrupted measurement metric) and, subsequently, the UE performing a successful operation.

As indicated above, FIGS. 5A and 5B are provided as an example. Other examples may differ from what is described with regard to FIGS. 5A and 5B.

FIG. 6 is a diagram illustrating an example 600 of collision monitoring procedure that may be implemented by a wireless communication device (e.g., a UE 120), in accordance with the present disclosure. To illustrate, the WLAN manager 506 of FIGS. 5A and 5B may perform the collision monitoring procedure illustrated by FIG. 6 as at least part of the collision monitoring procedure described with regard to reference number 542 and/or the collision monitoring procedure described with regard to reference number 550. However, in other examples, other wireless communication devices, RAT managers, and/or functional partitions may perform the collision monitoring procedure, such as the WWAN manager 504. In some aspects, the collision monitoring procedure may be implemented using any combination of software, firmware, and/or hardware as described herein. Some aspects of example 600 that are shown by FIG. 6 as being included in the collision monitoring procedure may be excluded from the collision monitoring procedure in other examples, such as calculating a mobility measurement metric and/or communicating a measurement report. To illustrate, the collision monitoring procedure may initiate and/or trigger functionality described with regard to the example 600, and the functionality may be performed by an alternate or additional procedure.

As shown by reference number 610, the WLAN manager 506 may perform a sensing procedure. To illustrate, the WLAN manager 506 may calculate, prior to a signal measurement occasion, a measurement metric (e.g., RSSI) to determine if a signal is present within a receive frequency band.

Alternatively, or additionally, the WLAN manager 506 may calculate a collision metric, as shown by reference number 615. In some aspects, the collision metric may indicate a likelihood of a WWAN transmission occurring during a WLAN signal measurement occasion (e.g., a measurement duration that may be used by the WLAN manager 506 to calculate and/or generate a WLAN mobility measurement metric). Some non-limiting examples of a collision metric may include a percentage of collisions over a measurement duration (e.g., a signal measurement occasion), a location of one or more collisions over the measurement duration, and/or an impact of collision as described with regard to FIG. 5B. In some aspects, the collision metric may be based at least in part on a signal measurement occasion and/or a frequency conflict duration, such as the percentage of collisions over the measurement duration. For instance, the WLAN manager 506 may compare a frequency conflict duration to a signal measurement occasion, such as by comparing a start time of the frequency conflict duration, an end time of the frequency conflict duration, and/or a length of the frequency conflict duration to the signal measurement occasion to determine if the frequency conflict duration at least partially overlaps with the signal measurement occasion as described with regard to FIG. 5B.

As shown by reference number 620, the WLAN manager 506 may evaluate whether a collision is present (e.g., a frequency collision between a WWAN transmission and WLAN reception during a signal measurement occasion). For example, the WLAN manager 506 may analyze the collision metric by comparing the collision metric to a likelihood threshold. Based at least in part on the collision metric satisfying the likelihood threshold, the WLAN manager 506 may conclude that a frequency collision exists and/or is present. Based at least in part on the collision metric failing to satisfy the likelihood threshold, the WLAN manager 506 may conclude that a frequency collision does not exist and/or is not present. As another example, the collision metric may indicate that the frequency conflict duration and/or a WWAN transmission duration does not overlap in time with a signal measurement occasion (e.g., an entirety of the signal measurement occasion and/or a sub-duration of the measurement occasion). Accordingly, the WLAN manager 506 may determine that a collision is not present. In other examples, the collision metric may indicate a collision is present based at least in part on the frequency conflict duration and/or the WWAN transmission duration at least partially overlapping with the signal measurement occasion.

Based at least in part on the WLAN manager 506 concluding that no collision is present, the process may follow the "NO" path, and the WLAN manager 506 may calculate a mobility measurement metric as described with regard to reference number 542 and/or may update a measurement counter as shown by reference number 625. In some aspects, the measurement counter may indicate a number of calculated mobility measurement metrics calculated by the WLAN manager 506.

As shown by reference number 630, the WLAN manager 506 may evaluate whether the measurement counter satisfies a report threshold (e.g., a number of mobility measurement metrics to use to generate a measurement report). Based at least in part on concluding that the measurement counter fails to satisfy the report threshold, the process may follow the "NO" path as shown by reference number 635 to iteratively perform the sensing procedure described with regard to reference number 610, calculate the collision metric as described with regard to reference number 615, and/or evaluate whether a collision is present as described with regard to reference number 620. In some aspects, the WLAN manager 506 may delay performing a subsequent iteration of the sensing procedure, calculating the collision metric, and/or evaluating whether a collision is present. As one example, the WLAN manager 506 may delay performing a subsequent iteration until a next signal measurement occurrence and/or a time offset that is based at least in part on the next signal measurement occurrence.

Returning to the decision box shown by reference number 630, the WLAN manager 506 may conclude that the measurement counter satisfies the report threshold, and the process may follow the "YES" path that results in the WLAN manager communicating a measurement report as described with regard to reference number 564. In some aspects, and as shown by reference number 640, the WLAN manager 506 may clear and/or reinitialize one or more counters, such as by setting the measurement counter to zero and/or a discard counter to zero. As shown by reference number 645, the process may return to perform a subsequent iteration of the sensing procedure as described with regard to reference number 610, calculating the collision metric as described with regard to reference number 615, and/or evaluating whether a collision is present as described with regard to reference number 620. In other aspects, the WLAN manager 506 may cease performing the collision monitoring procedure.

Returning to the decision box described with regard to reference number 620, the WLAN manager 506 may conclude that a collision does exist and/or a collision is present (e.g., a frequency collision), and the process may follow the "YES" path. As shown by reference number 650, the WLAN manager 506 may update a discard counter that tracks a number of skipped measurements (e.g., not calculated), a number of signal measurement occasions (e.g., not used to calculate a mobility measurement metric), a number of signal measurement occasions, and/or a number of discarded measurements (e.g., calculated and discarded) that are skipped, discarded, and/or are associated with a potential frequency collision. Alternatively, or additionally, the WLAN manager 506 may refrain from calculating a mobility measurement metric (e.g., based at least in part on the collision metric indicating a high probability and/or likelihood of a collision being present). In the example 600, the WLAN manager 506 refrains from calculating the mobility measurement metric, but in other examples the WLAN manager 506 may calculate and discard the mobility measurement metric as at least part of selectively calculating the mobility measurement metric.

To illustrate, the WLAN manager 506 may calculate the mobility measurement metric irrespective of the collision metric and determine to discard the mobility measurement metric based at least in part on the collision metric indicating a high probability and/or likelihood of a collision. Accordingly, the WLAN manager 506 may selectively discard the mobility measurement metric (e.g., using the collision metric to determine whether to discard the mobility measurement metric).

As shown by reference number 655, the WLAN manager 506 may evaluate whether the discard counter satisfies a discard threshold. Based at least in part on the WLAN manager 506 concluding that the discard counter fails to satisfy the discard threshold, the process may follow the "NO" path as shown by reference number 660, and the WLAN manager 506 may iteratively perform the sensing procedure described with regard to reference number 610, calculate the collision metric as described with regard to reference number 615, and/or evaluate whether a collision is present as described with regard to reference number 620.

In some aspects, the discard threshold may be based at least in part on one or more channel conditions, such as a first channel condition associated with the WWAN and/or a second channel condition associated with the WLAN. To illustrate, in some scenarios, generating a mobility measurement metric for the WLAN (e.g., a target RAT) may be higher priority relative to generating a WWAN transmission (e.g., a source RAT transmission). For example, the WWAN may have a poor channel condition that indicates a trend toward a call drop (or other types of operation failures). In such a scenario, the discard threshold may have a lower number (e.g., 0) to decrease a wait time that delays transmitting the modification request as described with regard to reference number 552 and/or calculating the mobility measurement metric (e.g., using an uncorrupted signal and/or without a frequency collision) as described with regard to reference number 558. As another example, generating a mobility measurement metric for the WLAN may be lower priority relative to generating a WWAN transmission, such as in a scenario associated with the WWAN having good channel conditions that may indicate a trend away from a call drop (or other types of operation failures). In such a scenario, the discard threshold may have a higher number (e.g., ∞) relative to the lower number that increases a wait time for initiating a TX modification procedure.

Based at least in part on the WLAN manager 506 concluding that the discard counter satisfies the discard threshold, the process may follow the "YES" path, and the WLAN manager 506 may transmit a modification request (e.g., a TX modification request) as described with regard to reference number 552, may calculate a mobility measurement metric as described with regard to reference number 558, and/or may transmit a completion indication as described with regard to reference number 560. The process may proceed as shown by reference number 665, and the WLAN manager 506 may update the measurement counter as described with regard to 625, evaluate whether the measurement counter satisfies the report threshold as described with regard to reference number 630, and proceed via the "YES" path or the "NO" path based at least in part on the evaluation.

The use of a measurement counter and a discard counter may enable the WLAN manager 506 to identify the occurrence of N mobility measurement metrics (e.g., WLAN mobility measurement metrics) being discarded and/or not calculated, where Nis an integer. Based at least in part on identifying the N discarded (and/or not calculated) mobility measurement metrics, the WLAN manager 506 may request that the WWAN manager 504 initiate a TX modification procedure, such as a backoff procedure and/or a blanking procedure as described with regard to FIGS. 5A and 5B, for an N+1-th signal measurement occasion, to allow the WLAN manager 506 to calculate the mobility measurement metric with a clean and/or uncorrupted signal. Alternatively, or additionally, the use of a measurement counter enables the WLAN manager 506 to identify that K mobility measurement metrics (e.g., clean mobility measurement metrics that are based at least in part on an uncorrupted signal) have been calculated, where K is an integer. In some aspects, K may be based at least in part on a number of mobility measurement metrics that may be used to generate a valid measurement report and/or measurement result. Accordingly, the WLAN manager 506 may identify when K uncorrupted mobility measurement metrics have been obtained, and the WLAN manager 506 may reset the measurement counter and/or the discard counter.

The indication of a frequency conflict between a first RAT and a second RAT may enable a UE to perform a collision monitoring procedure that mitigates calculating a measurement metric using a corrupted signal. For instance, the collision monitoring procedure may evaluate whether a potential frequency collision is present as described above and mitigate using a corrupted signal in a measurement procedure that calculates a measurement metric. Mitigating the calculation of an inaccurate and/or corrupted measurement metric may enable the UE to make a more accurate operating decision and, consequently, may result in a successful operation performed by the UE.

As indicated above, FIG. 6 is provided as an example. Other examples may differ from what is described with regard to FIG. 6.

FIG. 7 is a diagram illustrating an example process 700 performed, for example, at a UE or an apparatus of a UE, in accordance with the present disclosure. Example process 700 is an example where the apparatus or the UE (e.g., UE 120) performs operations associated with mitigating frequency collisions in a measurement.

As shown in FIG. 7, in some aspects, process 700 may include receiving a conflict indication that indicates a frequency conflict between a first RAT supported by the UE and a second RAT supported by the UE (block 710). For example, the UE (e.g., using reception component 802 and/or communication manager 806, depicted in FIG. 8) may receive a conflict indication that indicates a frequency conflict between a first RAT supported by the UE and a second RAT supported by the UE, as described above.

As further shown in FIG. 7, in some aspects, process 700 may include performing, based at least in part on receiving the conflict indication, a collision monitoring procedure that is associated with the second RAT and includes at least: calculating at least a collision metric that is associated with the first RAT and the second RAT, the collision metric being based at least in part on a signal measurement occasion that is associated with generating a mobility measurement metric, the mobility measurement metric being associated with the second RAT (block 720). For example, the UE (e.g., using communication manager 806, depicted in FIG. 8) may perform, based at least in part on receiving the conflict indication, a collision monitoring procedure that is associated with the second RAT and includes at least: calculating at least a collision metric that is associated with the first RAT and the second RAT, the collision metric being based at least in part on a signal measurement occasion that is associated with generating a mobility measurement metric, the mobility measurement metric being associated with the second RAT, as described above.

As further shown in FIG. 7, in some aspects, process 700 may include selectively calculating the mobility measurement metric based at least in part on a frequency conflict duration, the signal measurement occasion, and the collision metric (block 730). For example, the UE (e.g., using communication manager 806, depicted in FIG. 8) may selectively calculate the mobility measurement metric based at least in part on a frequency conflict duration, the signal measurement occasion, and the collision metric, as described above.

Process 700 may include additional aspects, such as any single aspect or any combination of aspects described below and/or in connection with one or more other processes described elsewhere herein.

In a first aspect, receiving the conflict indication includes receiving first frequency configuration information that is associated with the first RAT, and receiving second frequency configuration information that is associated with the second RAT, and the first frequency configuration information and the second frequency configuration information indicate that a transmission associated with the first RAT at least partially overlaps with a frequency band that is associated with the second RAT.

In a second aspect, the frequency band associated with the second RAT is a second frequency band, the transmission associated with the first RAT is based at least in part on a first frequency band, and the transmission associated with the first RAT at least partially overlaps with the second frequency band associated with the second RAT based at least in part on at least one of the first frequency band at least partially over lapping with the second frequency band, transmit noise that is associated with the transmission associated with the first RAT at least partially overlapping with the second frequency band, a transmit signal that is based at least in part on the transmission associated with the first RAT acting as a jammer to the second frequency band, a harmonic associated with the transmission at least partially overlapping with the second frequency band, or an intermodulation signal associated with the transmission at least partially overlapping with the second frequency band.

In a third aspect, the frequency band is associated with the mobility measurement metric.

In a fourth aspect, process 700 includes receiving a mobility activation indication that indicates to commence a mobility measurement procedure that is associated with the second RAT, and activating the mobility measurement procedure that is associated with the second RAT.

In a fifth aspect, process 700 includes calculating a channel condition metric based at least in part on the first RAT, and activating the mobility measurement procedure based at least in part on the channel condition metric failing to satisfy a quality threshold.

In a sixth aspect, process 700 includes receiving a transmission indication that indicates transmission activity associated with the first RAT, and activating the collision monitoring procedure based at least in part on receiving the transmission indication and the mobility measurement procedure being activated.

In a seventh aspect, activating the collision monitoring procedure includes activating the collision monitoring procedure at a RAT manager that is associated with managing the second RAT.

In an eighth aspect, the collision monitoring procedure includes performing a sensing procedure that is associated with detecting a presence of a first RAT transmission.

In a ninth aspect, the collision monitoring procedure includes performing a sensing procedure based at least in part on receiving the transmission indication.

In a tenth aspect, the collision monitoring procedure includes identifying a potential frequency collision between a transmission associated with the first RAT and the signal measurement occasion.

In an eleventh aspect, selectively calculating the mobility measurement metric includes calculating the mobility measurement metric based at least in part on expiration of the frequency conflict duration, and process 700 includes discarding the mobility measurement metric based at least in part on identifying the potential frequency collision.

In a twelfth aspect, selectively calculating the mobility measurement metric includes refraining from calculating the mobility measurement metric based at least in part on identifying the potential frequency collision.

In a thirteenth aspect, process 700 includes updating a discard counter based at least in part on detecting the potential frequency collision.

In a fourteenth aspect, the potential frequency collision is based at least in part on the signal measurement occasion, and the discard counter indicates a number of signal measurement occasions associated with potential frequency collisions.

In a fifteenth aspect, the collision metric is based at least in part on at least one of a percentage of collisions over a measurement duration, a location of one or more collisions over the measurement duration, or an impact of collision.

In a sixteenth aspect, process 700 includes calculating that a discard counter associated with the collision monitoring procedure satisfies a discard threshold, and initiating, based at least in part on the discard counter satisfying the discard threshold, a transmission modification procedure associated with the first RAT.

In a seventeenth aspect, the transmission modification procedure includes a transmission blanking procedure, or a transmission backoff procedure.

In an eighteenth aspect, the discard threshold is based at least in part on a channel condition associated with the first RAT.

In a nineteenth aspect, selectively calculating the mobility measurement metric includes calculating the mobility measurement metric during the transmission modification procedure.

In a twentieth aspect, process 700 includes indicating to stop the transmission modification procedure based at least in part on calculating the mobility measurement metric.

In a twenty-first aspect, process 700 includes ceasing the transmission modification procedure.

In a twenty-second aspect, process 700 includes performing, based at least in part on the mobility measurement metric, a connection handover that is associated with moving a connection from the first RAT to the second RAT.

In a twenty-third aspect, the connection is associated with a voice call.

In a twenty-fourth aspect, in the connection is associated with user data.

In a twenty-fifth aspect, the first RAT includes a WWAN and the second RAT includes a WLAN.

In a twenty-sixth aspect, the first RAT includes a WLAN and the second RAT includes a WWAN.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
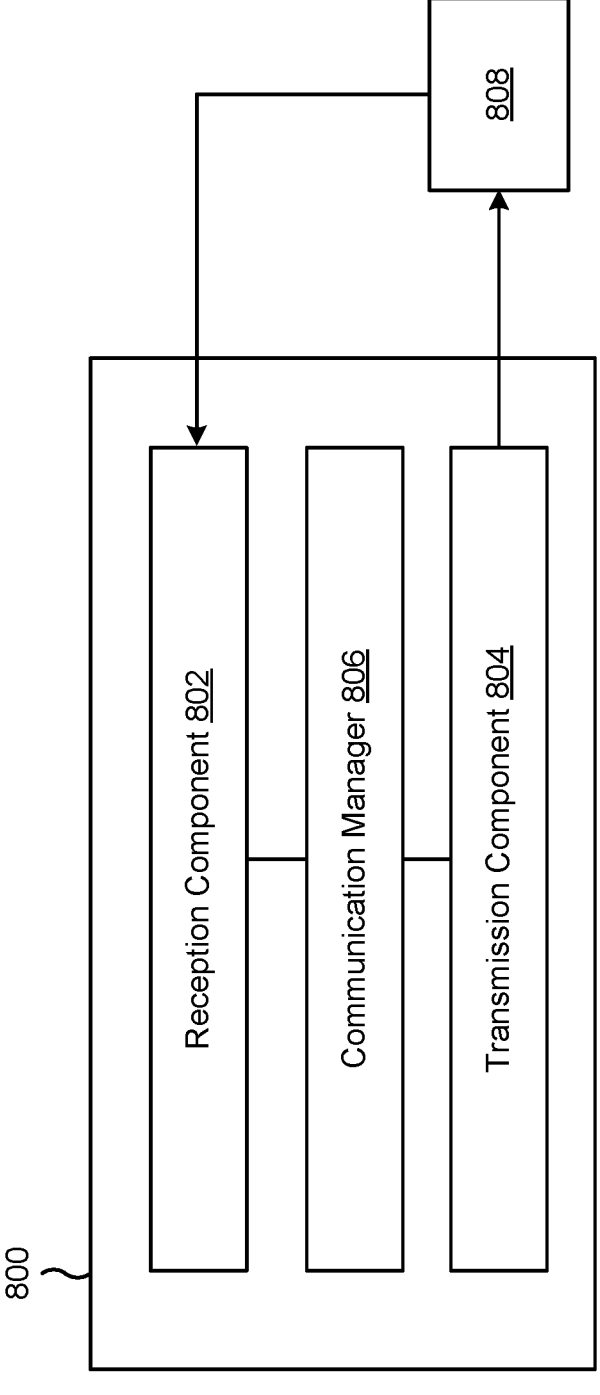
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a UE, or a UE may include the apparatus 800. In some aspects, the apparatus 800 includes a reception component 802, a transmission component 804, and/or a communication manager 806, which may be in communication with one another (for example, via one or more buses and/or one or more other components). In some aspects, the communication manager 806 is the communication manager 140 described in connection with FIG. 1. As shown, the apparatus 800 may communicate with another apparatus 808, such as a UE or a network node (such as a CU, a DU, an RU, or a base station), using the reception component 802 and the transmission component 804.

In some aspects, the apparatus 800 may be configured to perform one or more operations described herein in connection with FIGS. 4A-7. Additionally, or alternatively, the apparatus 800 may be configured to perform one or more processes described herein, such as process 700 of FIG. 7, or a combination thereof. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 802 may receive communications, such as reference signals, control information, data communications, or a combination thereof, from the apparatus 808. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 804 may transmit communications, such as reference signals, control information, data communications, or a combination thereof, to the apparatus 808. In some aspects, one or more other components of the apparatus 800 may generate communications and may provide the generated communications to the transmission component 804 for transmission to the apparatus 808. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 804 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 804 may be co-located with the reception component 802 in one or more transceivers.

The communication manager 806 may support operations of the reception component 802 and/or the transmission component 804. For example, the communication manager 806 may receive information associated with configuring reception of communications by the reception component 802 and/or transmission of communications by the transmission component 804. Additionally, or alternatively, the communication manager 806 may generate and/or provide control information to the reception component 802 and/or the transmission component 804 to control reception and/or transmission of communications.

The reception component 802 may receive a conflict indication that indicates a frequency conflict between a first RAT supported by the UE and a second RAT supported by the UE. The communication manager 806 may perform, based at least in part on receiving the conflict indication, a collision monitoring procedure that is associated with the second RAT and includes at least calculating at least a collision metric that is associated with the first RAT and the second RAT, the collision metric being based at least in part on a signal measurement occasion that is associated with generating a mobility measurement metric, the mobility measurement metric being associated with the second RAT. The communication manager 806 may selectively calculate the mobility measurement metric based at least in part on a frequency conflict duration, the signal measurement occasion, and the collision metric.

The reception component 802 may receive a mobility activation indication that indicates to commence a mobility measurement procedure that is associated with the second RAT. Alternatively, or additionally, the communication manager 806 may activate the mobility measurement procedure that is associated with the second RAT.

The communication manager 806 may calculate a channel condition metric based at least in part on the first RAT. In some aspects, the communication manager 806 may activate the mobility measurement procedure based at least in part on the channel condition metric failing to satisfy a quality threshold.

The reception component 802 may receive a transmission indication that indicates transmission activity associated with the first RAT. In some aspects, the communication manager 806 may activate the collision monitoring procedure based at least in part on receiving the transmission indication and the mobility measurement procedure being activated.

The communication manager 806 may update a discard counter based at least in part on detecting a potential frequency collision. Alternatively, or additionally, the communication manager 806 may calculate that a discard counter associated with the collision monitoring procedure satisfies a threshold. In some aspects, the communication manager 806 may initiate, based at least in part on the discard counter satisfying the threshold, a transmission modification procedure associated with the first RAT. At times, the communication manager 806 may indicate to stop the transmission modification procedure based at least in part on calculating the mobility measurement metric. Alternatively, or additionally, the communication manager 806 may cease the transmission modification procedure.

In some aspects, the communication manager 806 may perform, based at least in part on the mobility measurement metric, a connection handover that is associated with moving a connection from the first RAT to the second RAT.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving a conflict indication that indicates a frequency conflict between a first radio access technology (RAT) supported by the UE and a second RAT supported by the UE; performing, based at least in part on receiving the conflict indication, a collision monitoring procedure that is associated with the second RAT and comprises at least: calculating at least a collision metric that is associated with the first RAT and the second RAT, the collision metric being based at least in part on a signal measurement occasion that is associated with generating a mobility measurement metric, the mobility measurement metric being associated with the second RAT; and selectively calculating the mobility measurement metric based at least in part on a frequency conflict duration, the signal measurement occasion, and the collision metric.

Aspect 2: The method of Aspect 1, wherein receiving the conflict indication comprises: receiving first frequency configuration information that is associated with the first RAT; and receiving second frequency configuration information that is associated with the second RAT, wherein the first frequency configuration information and the second frequency configuration information indicate that a transmission associated with the first RAT at least partially overlaps with a frequency band that is associated with the second RAT.

Aspect 3: The method of Aspect 2, wherein the frequency band associated with the second RAT is a second frequency band, the transmission associated with the first RAT is based at least in part on a first frequency band, and the transmission associated with the first RAT at least partially overlaps with the second frequency band associated with the second RAT based at least in part on at least one of: the first frequency band at least partially over lapping with the second frequency band, transmit noise that is associated with the transmission associated with the first RAT at least partially overlapping with the second frequency band, a transmit signal that is based at least in part on the transmission associated with the first RAT acting as a jammer to the second frequency band, a harmonic associated with the transmission at least partially overlapping with the second frequency band, or an intermodulation signal associated with the transmission at least partially overlapping with the second frequency band.

Aspect 4: The method of Aspect 2, wherein the frequency band is associated with the mobility measurement metric.

Aspect 5: The method of any of Aspects 1-4, further comprising: receiving a mobility activation indication that indicates to commence a mobility measurement procedure that is associated with the second RAT; and activating the mobility measurement procedure that is associated with the second RAT.

Aspect 6: The method of Aspect 5, further comprising: calculating a channel condition metric based at least in part on the first RAT; and activating the mobility measurement procedure based at least in part on the channel condition metric failing to satisfy a quality threshold.

Aspect 7: The method of Aspect 5, further comprising: receiving a transmission indication that indicates transmission activity associated with the first RAT; and activating the collision monitoring procedure based at least in part on receiving the transmission indication and the mobility measurement procedure being activated.

Aspect 8: The method of any one of Aspects 1-7, wherein activating the collision monitoring procedure comprises: activating the collision monitoring procedure at a RAT manager that is associated with managing the second RAT.

Aspect 9: The method of any one of Aspects 1-7, wherein the collision monitoring procedure further comprises: performing a sensing procedure that is associated with detecting a presence of a first RAT transmission.

Aspect 10: The method of any one of Aspects 1-7, wherein the collision monitoring procedure further comprises: performing a sensing procedure based at least in part on receiving the transmission indication.

Aspect 11: The method of any one of Aspects 1-7, wherein the collision monitoring procedure further comprises: identifying a potential frequency collision between a transmission associated with the first RAT and the signal measurement occasion.

Aspect 12: The method of Aspect 11, wherein selectively calculating the mobility measurement metric comprises: calculating the mobility measurement metric based at least in part on expiration of the frequency conflict duration; and the method further comprises: discarding the mobility measurement metric based at least in part on identifying the potential frequency collision.

Aspect 13: The method of Aspect 11, wherein selectively calculating the mobility measurement metric comprises: refraining from calculating the mobility measurement metric based at least in part on identifying the potential frequency collision.

Aspect 14: The method of Aspect 11, further comprising: updating a discard counter based at least in part on detecting the potential frequency collision.

Aspect 15: The method of Aspect 14, wherein the potential frequency collision is based at least in part on the signal measurement occasion, and wherein the discard counter indicates a number of signal measurement occasions associated with potential frequency collisions.

Aspect 16: The method of any of Aspects 1-15, wherein the collision metric is based at least in part on at least one of: a percentage of collisions over a measurement duration, a location of one or more collisions over the measurement duration, or an impact of collision.

Aspect 17: The method of any of Aspects 1-16, further comprising: calculating that a discard counter associated with the collision monitoring procedure satisfies a discard threshold; and initiating, based at least in part on the discard counter satisfying the discard threshold, a transmission modification procedure associated with the first RAT.

Aspect 18: The method of Aspect 17, wherein the transmission modification procedure comprises: a transmission blanking procedure, or a transmission backoff procedure.

Aspect 19: The method of Aspect 17 or Aspect 18, wherein the discard threshold is based at least in part on a channel condition associated with the first RAT.

Aspect 20: The method of any one of Aspects 17-19, wherein selectively calculating the mobility measurement metric comprises: calculating the mobility measurement metric during the transmission modification procedure.

Aspect 21: The method of Aspect 20, further comprising: indicating to stop the transmission modification procedure based at least in part on calculating the mobility measurement metric.

Aspect 22: The method of Aspect 21, further comprising: ceasing the transmission modification procedure.

Aspect 23: The method of any one of Aspects 20-22, further comprising: performing, based at least in part on the mobility measurement metric, a connection handover that is associated with moving a connection from the first RAT to the second RAT.

Aspect 24: The method of Aspect 23, wherein the connection is associated with a voice call.

Aspect 25: The method of Aspect 23, where in the connection is associated with user data.

Aspect 26: The method of any of Aspects 1-25, wherein the first RAT comprises a wireless wide area network (WWAN) and the second RAT comprises a wireless local area network (WLAN).

Aspect 27: The method of any of Aspects 1-25, wherein the first RAT comprises a wireless local area network (WLAN) and the second RAT comprises a wireless wide area network (WWAN).

Aspect 28: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-27.

Aspect 29: An apparatus for wireless communication at a device, the apparatus comprising one or more memories and one or more processors coupled to the one or more memories, the one or more processors configured, individually or collectively, to cause the device to perform the method of one or more of Aspects 1-27.

Aspect 30: An apparatus for wireless communication, the apparatus comprising at least one means for performing the method of one or more of Aspects 1-27.

Aspect 31: A non-transitory computer-readable medium storing code for wireless communication, the code comprising instructions executable by one or more processors to perform the method of one or more of Aspects 1-27.

Aspect 32: A non-transitory computer-readable medium storing a set of instructions for wireless communication, the set of instructions comprising one or more instructions that, when executed by one or more processors of a device, cause the device to perform the method of one or more of Aspects 1-27.

Aspect 33: A device for wireless communication, the device comprising a processing system that includes one or more processors and one or more memories coupled with the one or more processors, the processing system configured to cause the device to perform the method of one or more of Aspects 1-27.

Aspect 34: An apparatus for wireless communication at a device, the apparatus comprising one or more memories and one or more processors coupled to the one or more memories, the one or more processors individually or collectively configured to cause the device to perform the method of one or more of Aspects 1-27.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
one or more memories; and
one or more processors, coupled to the one or more memories, configured to cause the UE to:
receive a conflict indication that indicates a frequency conflict between a first radio access technology (RAT) supported by the UE and a second RAT supported by the UE;
perform, based at least in part on receiving the conflict indication, a collision monitoring procedure that is associated with the second RAT and comprises at least:
calculate at least a collision metric that is associated with the first RAT and the second RAT, the collision metric being based at least in part on a signal measurement occasion that is associated with generating a mobility measurement metric, the mobility measurement metric being associated with the second RAT; and
selectively calculate the mobility measurement metric based at least in part on a frequency conflict duration, the signal measurement occasion, and the collision metric.

2. The apparatus of claim 1, wherein the one or more processors, to cause the UE to receive the conflict indication, are configured to cause the UE to:

receive first frequency configuration information that is associated with the first RAT; and receive second frequency configuration information that is associated with the second RAT, wherein the first frequency configuration information and the second frequency configuration information indicate that a transmission associated with the first RAT at least partially overlaps with a frequency band that is associated with the second RAT.

3. The apparatus of claim 2, wherein the frequency band associated with the second RAT is a second frequency band, the transmission associated with the first RAT is based at least in part on a first frequency band, and the transmission associated with the first RAT at least partially overlaps with the second frequency band associated with the second RAT based at least in part on at least one of:

the first frequency band at least partially over lapping with the second frequency band, transmit noise that is associated with the transmission associated with the first RAT at least partially overlapping with the second frequency band, a transmit signal that is based at least in part on the transmission associated with the first RAT acting as a jammer to the second frequency band, a harmonic associated with the transmission at least partially overlapping with the second frequency band, or an intermodulation signal associated with the transmission at least partially overlapping with the second frequency band.

4. The apparatus of claim 1, wherein the one or more processors are further configured to cause the UE to:

receive a mobility activation indication that indicates to commence a mobility measurement procedure that is associated with the second RAT; and activate the mobility measurement procedure that is associated with the second RAT.

5. The apparatus of claim 4, wherein the one or more processors are further configured to cause the UE to:

calculate a channel condition metric based at least in part on the first RAT; and activate the mobility measurement procedure based at least in part on the channel condition metric failing to satisfy a quality threshold.

6. The apparatus of claim 4, wherein the one or more processors are further configured to cause the UE to:

receive a transmission indication that indicates transmission activity associated with the first RAT; and activate the collision monitoring procedure based at least in part on receiving the transmission indication and the mobility measurement procedure being activated.

7. The apparatus of claim 6, wherein the one or more processors are further configured to cause the UE to:

identify a potential frequency collision between a transmission associated with the first RAT and the signal measurement occasion.

8. The apparatus of claim 7, wherein the one or more processors, to cause the UE to selectively calculate the mobility measurement metric, are configured to cause the UE to:

calculate the mobility measurement metric based at least in part on expiration of the frequency conflict duration; and the one or more processors are further configured to cause the UE to:

discard the mobility measurement metric based at least in part on identifying the potential frequency collision.

9. The apparatus of claim 7, wherein the one or more processors, to cause the UE to selectively calculate the mobility measurement metric, are configured to cause the UE to:

refrain from calculating the mobility measurement metric based at least in part on identifying the potential frequency collision.

10. The apparatus of claim 7, wherein the one or more processors are further configured to cause the UE to:

update a discard counter based at least in part on detecting the potential frequency collision.

11. The apparatus of claim 10, wherein the potential frequency collision is based at least in part on the signal measurement occasion, and wherein the discard counter indicates a number of signal measurement occasions associated with potential frequency collisions.

12. The apparatus of claim 1, wherein the one or more processors are further configured to cause the UE to:

calculate that a discard counter associated with the collision monitoring procedure satisfies a discard threshold; and initiate, based at least in part on the discard counter satisfying the discard threshold, a transmission modification procedure associated with the first RAT.

13. The apparatus of claim 12, wherein the one or more processors, to cause the UE to selectively calculate the mobility measurement metric, are configured to cause the UE to:

calculate the mobility measurement metric during the transmission modification procedure.

14. The apparatus of claim 13, wherein the one or more processors are further configured to cause the UE to:

indicate to stop the transmission modification procedure based at least in part on calculating the mobility measurement metric.

15. A method of wireless communication performed by a user equipment (UE), comprising:

receiving a conflict indication that indicates a frequency conflict between a first radio access technology (RAT) supported by the UE and a second RAT supported by the UE;

performing, based at least in part on receiving the conflict indication, a collision monitoring procedure that is associated with the second RAT and comprises at least:

calculating at least a collision metric that is associated with the first RAT and the second RAT, the collision metric being based at least in part on a signal measurement occasion that is associated with generating a mobility measurement metric, the mobility measurement metric being associated with the second RAT; and selectively calculating the mobility measurement metric based at least in part on a frequency conflict duration, the signal measurement occasion, and the collision metric.

16. The method of claim 15, wherein receiving the conflict indication comprises:

receiving first frequency configuration information that is associated with the first RAT; and receiving second frequency configuration information that is associated with the second RAT, wherein the first frequency configuration information and the second frequency configuration information indicate that a transmission associated with the first RAT at least partially overlaps with a frequency band that is associated with the second RAT.

17. The method of claim 16, wherein the frequency band associated with the second RAT is a second frequency band, the transmission associated with the first RAT is based at least in part on a first frequency band, and the transmission associated with the first RAT at least partially overlaps with the second frequency band associated with the second RAT based at least in part on at least one of:

the first frequency band at least partially over lapping with the second frequency band, transmit noise that is associated with the transmission associated with the first RAT at least partially overlapping with the second frequency band, a transmit signal that is based at least in part on the transmission associated with the first RAT acting as a jammer to the second frequency band, a harmonic associated with the transmission at least partially overlapping with the second frequency band, or an intermodulation signal associated with the transmission at least partially overlapping with the second frequency band.

18. The method of claim 15, further comprising:

receiving a mobility activation indication that indicates to commence a mobility measurement procedure that is associated with the second RAT; and activating the mobility measurement procedure that is associated with the second RAT.

19. The method of claim 18, further comprising:

calculating a channel condition metric based at least in part on the first RAT; and activating the mobility measurement procedure based at least in part on the channel condition metric failing to satisfy a quality threshold.

20. The method of claim 18, further comprising:

receiving a transmission indication that indicates transmission activity associated with the first RAT; and activating the collision monitoring procedure based at least in part on receiving the transmission indication and the mobility measurement procedure being activated.

21. The method of claim 20, wherein the collision monitoring procedure further comprises:

identifying a potential frequency collision between a transmission associated with the first RAT and the signal measurement occasion.

22. The method of claim 21, wherein selectively calculating the mobility measurement metric comprises:

calculating the mobility measurement metric based at least in part on expiration of the frequency conflict duration;

and the method further comprises:

discarding the mobility measurement metric based at least in part on identifying the potential frequency collision.

23. The method of claim 21, wherein selectively calculating the mobility measurement metric comprises:

refraining from calculating the mobility measurement metric based at least in part on identifying the potential frequency collision.

24. The method of claim 21, further comprising:

updating a discard counter based at least in part on detecting the potential frequency collision.

25. The method of claim 24, wherein the potential frequency collision is based at least in part on the signal measurement occasion, and wherein the discard counter indicates a number of signal measurement occasions associated with potential frequency collisions.

26. The method of claim 15, further comprising:

calculating that a discard counter associated with the collision monitoring procedure satisfies a discard threshold; and initiating, based at least in part on the discard counter satisfying the discard threshold, a transmission modification procedure associated with the first RAT.

27. The method of claim 26, wherein selectively calculating the mobility measurement metric comprises:

calculating the mobility measurement metric during the transmission modification procedure.

28. The method of claim 27, further comprising:

indicating to stop the transmission modification procedure based at least in part on calculating the mobility measurement metric.

29. A non-transitory computer-readable medium storing a set of instructions for wireless communication, the set of instructions comprising:

one or more instructions that, when executed by one or more processors of a user equipment (UE), cause the UE to:

receive a conflict indication that indicates a frequency conflict between a first radio access technology (RAT) supported by the UE and a second RAT supported by the UE;

perform, based at least in part on receiving the conflict indication, a collision monitoring procedure that is associated with the second RAT and comprises at least:

calculate at least a collision metric that is associated with the first RAT and the second RAT, the collision metric being based at least in part on a signal measurement occasion that is associated with generating a mobility measurement metric, the mobility measurement metric being associated with the second RAT; and selectively calculate the mobility measurement metric based at least in part on a frequency conflict duration, the signal measurement occasion, and the collision metric.

30. An apparatus for wireless communication, comprising:

means for receiving a conflict indication that indicates a frequency conflict between a first radio access technology (RAT) supported by a user equipment (UE) and a second RAT supported by the UE;

means for performing, based at least in part on receiving the conflict indication, a collision monitoring procedure that is associated with the second RAT and comprises at least:

means for calculating at least a collision metric that is associated with the first RAT and the second RAT, the collision metric being based at least in part on a signal measurement occasion that is associated with generating a mobility measurement metric, the mobility measurement metric being associated with the second RAT; and means for selectively calculating the mobility measurement metric based at least in part on a frequency conflict duration, the signal measurement occasion, and the collision metric.

* * * * *